US012748226B2

(12) United States Patent
Liu et al.

(10) Patent No.: US 12,748,226 B2
(45) Date of Patent: Sep. 29, 2026

(54) SYSTEMS AND METHODS FOR IMAGING AND DATA PROCESSING

(71) Applicant: SHANGHAI UNITED IMAGING HEALTHCARE CO., LTD., Shanghai (CN)

(72) Inventors: Yangyi Liu, Shanghai (CN); Jing Tang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 137 days.

(21) Appl. No.: 18/769,367

(22) Filed: Jul. 10, 2024

(65) Prior Publication Data

US 2024/0361481 A1 Oct. 31, 2024

Related U.S. Application Data

(63) Continuation of application No. PCT/CN2023/102959, filed on Jun. 27, 2023.

(30) Foreign Application Priority Data

Jun. 27, 2022 (CN) ......................... 202210736203.1

(51) Int. Cl.
*G01T 1/29* (2006.01)
*G01T 7/00* (2006.01)

(52) U.S. Cl.
CPC .......... *G01T 1/2992* (2013.01); *G01T 1/2971* (2013.01); *G01T 1/2985* (2013.01); *G01T 7/005* (2013.01)

(58) Field of Classification Search
CPC ... G01T 1/2992; G01T 1/2971; G01T 1/2985; G01T 7/005
See application file for complete search history.

(56) References Cited

U.S. PATENT DOCUMENTS

| | | | |
|---|---|---|---|
| 9,554,760 | B2 | 1/2017 | Rodrigues et al. |
| 2005/0089135 | A1 | 4/2005 | Toth et al. |
| 2012/0087463 | A1 | 4/2012 | Greenberg et al. |
| 2013/0182820 | A1 | 7/2013 | Proksa |

(Continued)

FOREIGN PATENT DOCUMENTS

| | | | | |
|---|---|---|---|---|
| CN | 109171791 A | 1/2019 | | |
| EP | 3001880 B1 * | 11/2016 | .............. | H01J 35/18 |

(Continued)

OTHER PUBLICATIONS

International Search Report in PCT/CN2023/102959 mailed on Sep. 13, 2023, 5 pages.

(Continued)

*Primary Examiner* — Uzma Alam
*Assistant Examiner* — Fani Polyzos Boosalis
(74) *Attorney, Agent, or Firm* — METIS IP LLC

(57) ABSTRACT

The embodiments of the present disclosure provide a method, system, and readable medium for data processing. The method may include: obtaining one or more data processing parameters, the one or more data processing parameters being determined based on a reference detector module; obtaining target data of a target object collected by one or more signal detectors; and processing the target data based on the one or more data processing parameters.

20 Claims, 12 Drawing Sheets

1100

(56) References Cited

U.S. PATENT DOCUMENTS

| | | | |
|---|---|---|---|
| 2014/0072098 | A1 | 3/2014 | Kappler |
| 2015/0160355 | A1 | 6/2015 | Wang et al. |
| 2016/0095564 | A1 | 4/2016 | Kato et al. |
| 2017/0086761 | A1 | 3/2017 | Fu et al. |
| 2018/0158215 | A1 | 6/2018 | Pang et al. |
| 2019/0021685 | A1 | 1/2019 | Kojima et al. |
| 2020/0222024 | A1 | 7/2020 | Edic et al. |
| 2020/0364909 | A1 | 11/2020 | Bai et al. |

FOREIGN PATENT DOCUMENTS

| | | | | | |
|---|---|---|---|---|---|
| GB | 1374610 | A | | 11/1974 | |
| JP | 2022013686 | A | * | 1/2022 | ........... G01N 23/046 |
| WO | WO-2006022932 | A1 | * | 3/2006 | .......... H01P 1/20336 |

OTHER PUBLICATIONS

Written Opinion in PCT/CN2023/102959 mailed on Sep. 13, 2023, 4 pages.

The Extended European Search Report in European Application No. 23809945.1 mailed on Jul. 26, 2024, 14 pages.

Li, Zhoubo et al., Estimation of signal and noise for a whole-body research photon-counting CT system, Journal of Medical Imaging, 4(2), 2017, 15 pages.

Adam P et al., Amultichannel block-matching denoising algorithm for spectral photon-counting CT images, Medical physics, 44(6): 2447-2452, 2017.

First Office Action in Chinese Application No. 202210736203.1 mailed on Mar. 16, 2026, 16 pages.

* cited by examiner

900

SYSTEMS AND METHODS FOR IMAGING AND DATA PROCESSING

CROSS-REFERENCE TO RELATED APPLICATIONS

This application is a Continuation of International Application No. PCT/CN2023/102959, filed on Jun. 27, 2023, which claims priority to Chinese Patent Application No. 202210736203.1, filed on Jun. 27, 2022, the contents of which are hereby incorporated by reference.

TECHNICAL FIELD

The present disclosure relates to the field of medical devices, and more particularly, to systems and methods for imaging and data processing.

BACKGROUND

A Computed Tomography (CT) imaging device uses X-rays to scan a layer of a human body with a certain thickness, a CT detector may receive the X-rays passing through the layer and convert X-ray radiation into visible lights, then convert the visible lights into electrical signals and then convert the electrical signals into digital signals through analog/digital conversion. After being converted into digital signals (or data) through an analog/digital converter, image information may be generated finally by inputting the data into a processing device for processing, which can provide basis for doctors to determine whether tissues of a patient have undergone pathological changes. A high-quality CT image may not only depend on scanning parameter setting, but also on data processing parameter selection during at least one of reconstruction, correction, postprocessing, or other processes, or the like.

In the CT system, reference detector(s) are widely used for correcting the responses of detectors under different working conditions. For an energy integrating detector, an output counting rate thereof may maintain a relatively good linear response to the input counting rate over a wide range, and may change little with time, resulting in a relatively good long-term stability of the detector. In a photon-counting computed tomography (PCCT) system, the output characteristics of photon counting detector(s) may be strongly influenced by working conditions, and differences between multiple outputs at different times may be obvious, resulting in a relatively poor long-term stability. Because of different product processes of different detectors, the detectors may have nonlinear responses (between the output counting rate and the input counting rate) induced by varying degrees of pulse stacking, polarization effects, and pre conditions.

Therefore, it is desirable to provide detector(s) for an imaging system to provide reference standards for at least one of imaging or data processing, so as to determine more reasonable and accurate data processing parameters.

SUMMARY

According to an aspect of the present disclosure, a method implemented on at least one machine each of which has at least one processor and at least one storage device for data processing may be provided. The method may include obtaining one or more data processing parameters, the one or more data processing parameters being determined based on a reference detector module; obtaining target data of a target object collected by one or more signal detectors; and processing the target data based on the one or more data processing parameters.

According to another aspect of the present disclosure, a method implemented on at least one machine each of which has at least one processor and at least one storage device for imaging may be provided. The detector module may include obtaining at least one of a scan protocol or information of a target object; configuring a prefilter of a reference detector module in an imaging device based on at least one of the scan protocol or the information of the target object; and correcting one or more target signals collected by one or more signal detectors using the reference detector module.

According to another aspect of the present disclosure, a detector module for an imaging system may be provided. The detector module may include a processing device configured to obtain reference data output by a reference detector module, analyze the reference data, and determine one or more data processing parameters for one or more signal detectors; wherein the reference detector module may include at least one prefilter, the at least one prefilter may be configured to match with at least one reference detector of the reference detector module.

According to another aspect of the present disclosure, a system for data processing may be provided. The system may include at least one storage device storing a set of instructions; and at least one processor in communication with the storage device, wherein when executing the set of instructions, the at least one processor may be configured to cause the system to perform operations including: obtaining one or more data processing parameters, the one or more data processing parameters being determined based on a reference detector module; obtaining target data of a target object collected by one or more signal detectors; and processing the target data based on the one or more data processing parameters.

According to another aspect of the present disclosure, a system for data processing may be provided. The system may include a third obtaining module, configured to obtain one or more data processing parameters, the one or more data processing parameters being determined based on a reference detector module; a fourth obtaining module, configured to obtain target data of a target object collected by one or more signal detectors; and a data processing module, configured to process the target data based on the one or more data processing parameters.

According to another aspect of the present disclosure, a non-transitory computer readable medium may be provided. The non-transitory computer readable medium may include obtaining one or more data processing parameters, the one or more data processing parameters being determined based on a reference detector module; obtaining target data of a target object collected by one or more signal detectors; and processing the target data based on the one or more data processing parameters.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein.

DETAILED DESCRIPTION

Figure 1:
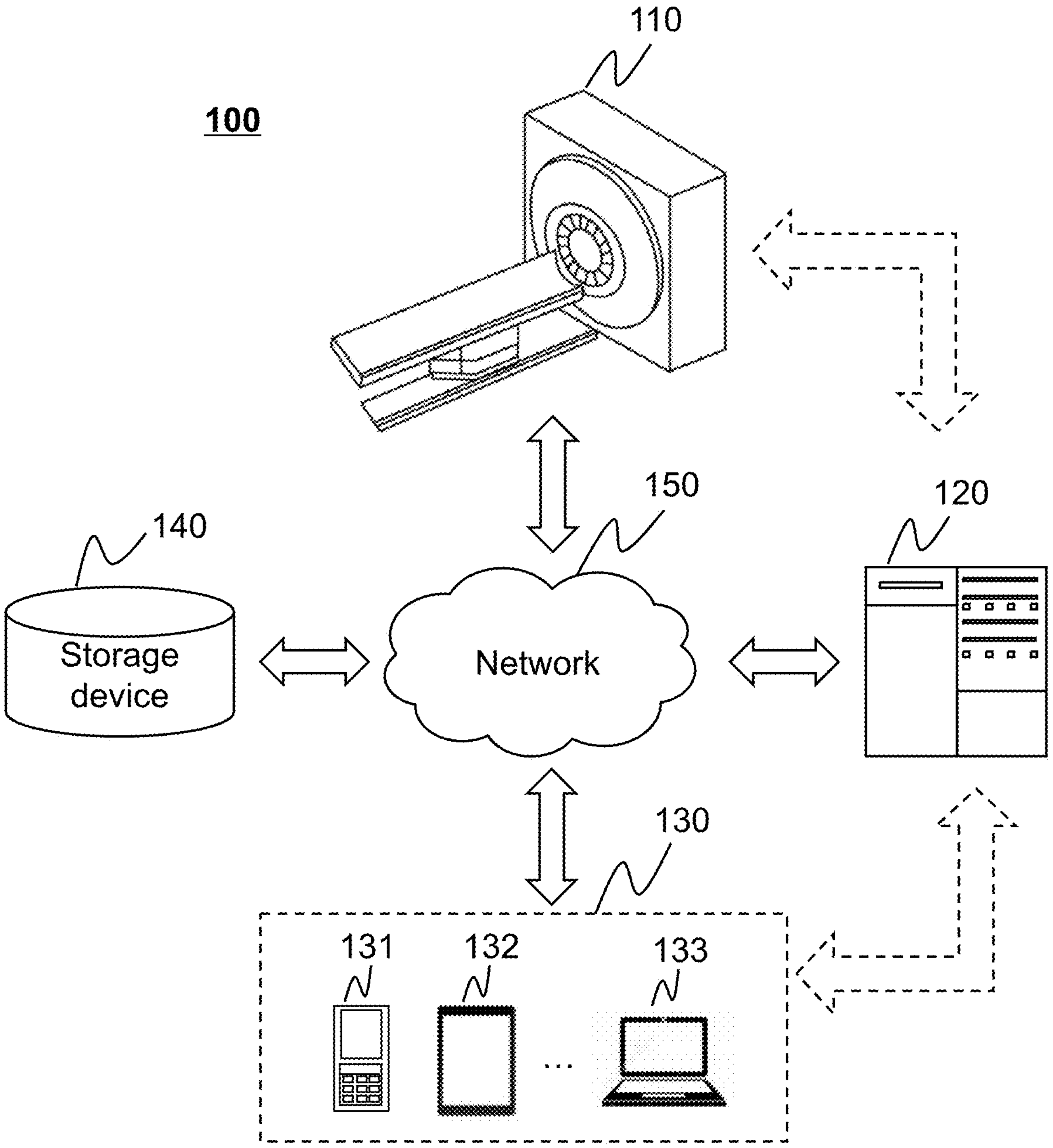
FIG. 1 is a schematic diagram illustrating application scenario of an exemplary imaging system according to some embodiments of the present disclosure.

To more clearly illustrate the technical solutions related to the embodiments of the present disclosure, a brief introduction of the drawings referred to the description of the embodiments is provided below. Obviously, the accompanying drawing in the following description is merely some examples or embodiments of the present disclosure, for those skilled in the art, the present disclosure may further be applied in other similar situations according to the drawings without any creative effort. Unless obviously obtained from the context or the context illustrates otherwise, the same numeral in the drawings refers to the same structure or operation.

It will be understood that the term "system," "device," "unit," and/or "module" used herein are one method to distinguish different components, elements, parts, sections or assemblies of different levels in ascending order. However, if other words may achieve the same purpose, the words may be replaced by other expressions.

As used in the disclosure and the appended claims, the singular forms "a," "an," and "the" include plural referents unless the content clearly dictates otherwise. Generally speaking, the terms "comprise" and "include" only imply that the clearly identified steps and elements are included, and these steps and elements may not constitute an exclusive list, and the method or device may further include other steps or elements.

The flowcharts used in the present disclosure illustrate operations that the system implements according to the embodiment of the present disclosure. It should be understood that a previous operation or a subsequent operation of the flowcharts may not be accurately implemented in order. Instead, a plurality of steps may be processed in reverse or simultaneously. Moreover, other operations may further be added to these procedures, or one or more steps may be removed from these procedures.

FIG. 1 is a schematic diagram illustrating application scenario of an exemplary imaging system according to some embodiments of the present disclosure.

As shown in FIG. 1, the imaging system 100 may include an imaging device 110, a processing device 120, one or more terminals 130, a storage device 140, and a network 150. The components in the imaging system 100 may be connected in one or more of various ways. Merely for example, as shown in FIG. 1, the imaging device 110 may be connected with the processing device 120 through the network 150. As another example, the imaging device 110 may be directly connected with the processing device 120, for example, the imaging device 110 and the processing device 120 may be connected as indicated by a dashed bidirectional arrow in the figure. As a further example, the storage device 140 may be directly connected with the processing device 120 (not shown in FIG. 1) or connected through the network 150. As a further example, one or more terminals 130 may be connected with the processing device 120 directly (e.g., as shown by the dashed bidirectional arrow that connects the terminal 130 and the processing device 120) or connected through the network 150.

The imaging device 110 may be configured to scan a target object within a detection region to obtain scanning data of the target object. In some embodiments, the target object may include a biological object and/or a non-biological object. For example, the target object may include specific parts of the body, such as a head, a chest, an abdomen, etc., or any combination thereof. As another example, the target object may be an artificial component of living or inanimate organic and/or inorganic substances. In some embodiments, the scanning data of the target object may include projection data of the target object, one or more scanning images, etc.

In some embodiments, the imaging device 110 may include a non-invasive biological imaging device for disease diagnosis or research purposes. For example, the imaging device 110 may include a single mode scanner and/or multimodal scanner. The single mode scanner may include an ultrasound scanner, an X-ray scanner, a computed tomography (CT) scanner, a magnetic resonance imaging (MRI) scanner, an ultrasound examiner, a positron emission tomography (PET) scanner, an optical coherence tomography (OCT) scanner, an ultrasound (US) scanner, an intravascular ultrasound (IVUS) scanner, a near-infrared spectroscopy (NIRS), a far infrared (FIR) scanner, or the like. The multimodal scanner may include an X-ray imaging magnetic resonance imaging (X-ray MRI) scanner, a positron emission tomography X-ray imaging (PET-X-ray) scanner, a single photon emission computed tomography magnetic resonance imaging (SPECT-MRI) scanner, a positron emission tomography computed tomography (PET-CT) scanner, a digital subtraction angiography magnetic resonance imaging (DSA-MRI) scanner, or the like. The scanner provided above is for illustrative purposes only and is not intended to limit the scope of the present disclosure. As used in the present disclosure, the term "imaging modality" or "modality" broadly refers to imaging processes or techniques that collect, generate, process, and/or analyze imaging information of the target object.

In some embodiments, the imaging device 110 may include modules and/or components used to perform imaging and/or related analysis. In some embodiments, the imaging device 110 may include a ray generating device, a ray accessory device, and a ray detection device. The ray generating device refers to a device for generating and controlling the rays (e.g., the X-rays). The accessory device refers to various facilities that cooperates with the ray generating device and is designed to satisfy the requirements of clinical diagnosis and treatment, including mechanical device(s) such as an examination bed, a diagnostic bed, a catheter bed, a photography bed, various supports, a suspension device, a braking device, a filter grid, a holding device, a wire shield, or the like. In some embodiments, the ray detection device may be in various forms, for example, a digital detection device may include a detector, a computer system, and an image processing software, or the like; other detection devices may include a fluorescent screen, a film cassette, an image intensifier, an image television, or the like.

The embodiments in the present disclosure may take the imaging device including the digital detection device as an example for illustration. The detector may be configured to convert the collected optical signals into electrical signals.

In some embodiments, the imaging device 110 may include one or more reference detectors and one or more signal detectors. The reference detector may be configured to measure an energy strength of original rays not passing through the target object (e.g., rays that bypass the target object). The signal detector may be configured to receive the rays that pass through the target object to obtain scanning data of the target object. Energy data of the rays (e.g., the X-ray) measured by the reference detector(s) may be designated as reference data of the target object, which may be used to correct signal detector response(s) under different working conditions (e.g., nonlinear response(s) between the output counting rate and the input counting rate induced by pulse stacking, polarization effects, and pre-condition, or the like) and improve the image quality.

In some embodiments, the imaging device 110 may include one or more reference detectors, the one or more reference detectors may form one or more reference detector modules. A reference detector module may include one or more reference detectors. In some embodiments, the imaging device 110 may include one or more signal detectors, the one or more signal detectors may form one or more signal detector modules. A signal detector module may include one or more signal detectors.

In some embodiments, the detector (e.g., the reference detector, the signal detector) may include a photosensitive module and a readout circuit. The photosensitive module may be configured to collect a photon signal of an incident ray and convert the collected photon signal into an electrical signal. The readout circuit may be configured to convert and read out the electrical signal collected by the photosensitive module into digital data to reconstruct medical image(s), or the like. In some embodiments, the detector (e.g., the reference detector, the signal detector) may include a semiconductor detector, a photovoltaic detector, or the like, which may not be limited herein.

In some embodiments, data obtained by the imaging device 110 (e.g., the medical image of the target object, output data of the detector, etc.) may be transmitted to the processing device 120 for further analysis. Alternatively, the data obtained by the imaging device 110 may be transmitted to the terminal (e.g., the terminal 130) for displaying and/or to the storage device (e.g., the storage device 140) for storage.

The processing device 120 may process data and/or information obtained/extracted by the imaging device 110, the terminal 130, the storage device 140, and/or other storage devices. For example, the processing device 120 may obtain and analyze reference data output by the reference detector module to determine data processing parameters for the scanning data of the signal detectors.

In some embodiments, the processing device 120 may be a single server or a group of servers. The group of servers may be centralized or distributed. In some embodiments, the processing device 120 may be local or remote. In some embodiments, the processing device 120 may be implemented on a cloud platform. Merely for example, the cloud platform may include a private cloud, a public cloud, a hybrid cloud, a community cloud, a distributed cloud, an internal cloud, a multi-layer cloud, or any combination thereof. In some embodiments, the processing device 120 may be implemented on a computing device. In some embodiments, the processing device 120 may be implemented on a terminal (e.g., the terminal 130). In some embodiments, the processing device 120 may be implemented on the imaging device (e.g., the imaging device 110). For example, the processing device 120 may be integrated into the terminal 130 and/or the imaging device 110.

The terminal 130 may be connected with the imaging device 110 and/or the processing device 120, and may be configured to input/output information and/or data. For example, the user may interact with the imaging device 110 through the terminal 130 to control one or more components of the imaging device 110. As another example, the imaging device 110 may output the generated medical image to the terminal 130 for displaying to the user.

In some embodiments, the terminal may include mobile devices 131, tablet computers 132, laptop computers 133, or any combination thereof. In some embodiments, the mobile device 131 may include smart home devices, wearable devices, smart mobile devices, virtual reality devices, augmented reality devices, or any combination thereof.

In some embodiments, one or more terminals 130 may remotely operate the imaging device 110. In some embodiments, the terminal 130 may operate the imaging device 110 via the wireless connection. In some embodiments, one or more terminals 130 may be part of the processing device 120. In some embodiments, the terminal(s) 130 may be omitted.

The storage device 140 may store data and/or instructions. In some embodiments, the storage device 140 may store data obtained by the terminal 130 and/or the processing device 120. For example, the storage device 140 may store reference data output by the reference detector, detection data output by the signal detectors, etc. In some embodiments, the storage device 140 may store data and/or instructions, and the processing device 120 may perform the exemplary process(es) in the present disclosure by performing or using the data and/or instructions.

In some embodiments, the storage device 140 may include a mass storage device, a removable storage device, a volatile read/write memory, a read-only memory (ROM), or any combination thereof. The exemplary mass storage device may include a disk, an optical disk, a solid-state drive, or the like. The exemplary removable storage device may include a flash drive, a floppy disk, an optical disk, a memory card, a compressed disk, a magnetic tape, or the like. The example volatile read/write memory may include a random access memory (RAM). In some embodiments, the storage device 140 may be implemented on a cloud platform. In some embodiments, the storage device 140 may be part of the processing device 120.

The network 150 may include any suitable network that can facilitate the exchange of information and/or data of the imaging system 100. In some embodiments, one or more components of the imaging system 100 (e.g., the imaging device 110, one or more terminal 130, the processing device 120 or the storage device 140) may communicate with one or more components of the imaging system 100 to transmit information and/or data. In some embodiments, the network 150 may be any type of wired or wireless network or combination thereof. For example, the network 150 may be and/or include a public network (e.g., the Internet), a private network (e.g., a local area network (LAN), a wide area network (WAN), etc.), a wired network (e.g., Ethernet), a wireless network (e.g., 802.11 networks, Wi-Fi networks, etc.), a cellular network (e.g., a long-term evolution (LTE) network), a Frame Relay network, a virtual private network ("VPN"), a Satellite Network, a telephone network, routers, hubs, switches, server computers, and/or any combination thereof. In some embodiments, the network 150 may include one or more network access points.

It should be noted that the above description of the imaging system 100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the imaging device 110, the processing device 120, and the terminal 130 may share a storage device 140 or have their own storage devices.

In some embodiments, the detector may include at least one of a photon counting detector (PCD) or an energy integrating detector (EID).

When rays are emitted into a semiconductor detector and deposited in a pixel, a corresponding photon may generate an electron hole pair, the electron hole pair may separate and drift to a corresponding electrode under a high voltage (e.g., a bias voltage of 100-150 V) to generate induced charges. The detector may output photon counting values or charge integration for different energy intervals by collecting the induced charges on the electrode. The detector that outputs the photon counting values of different energy intervals refers to a photon counting detector, and a detector that outputs charge integration of different energy intervals refers to an energy integration detector. For example, the photon counting detector may include a counting integrated circuit including a preamplifier circuit, a shaping filter circuit, a pulse comparator, and a digital signal output circuit. By comparing the pulses of filtered signals, the photon counting values for different energy intervals may be output. As another example, the energy integrating detector may include an integrating integrated circuit including a shaping filter circuit and a charge integrating circuit. By performing current integrating on the shaped filtered photocurrents (e.g., current signals generated by photon conversion), a charge integration of the photogenerated charge quantity may be achieved.

The CT imaging system configured based on the photon counting detector has advantages of achieving material composition analysis, reducing the patient radiation dose, improving the accuracy of CT quantitative analysis, and achieving ultra-high spatial resolution. Therefore, a Photon-Counting Computed Tomography (PCCT) has been widely used in the medical imaging.

For the energy integrating detector, an output counting rate may maintain a good linear response to the input counting rate over a wide range, and the difference between multiple outputs may be small, resulting in a good long-term stability of the detector. However, in the PCCT system, output characteristics of the photon counting detector are strongly influenced by working conditions, resulting in significant differences between multiple outputs at different times and a poor long-term stability. Moreover, because of different product processes of different detectors, the detectors may have nonlinear responses (between the output counting rate and the input counting rate) induced by varying degrees of pulse stacking, polarization effects, and pre conditions.

In some embodiments, a polarization effect in the PCCT system may be solved by real-time monitoring of detector characteristics (e.g., a photon counting threshold, a leakage current value, etc.) through a fixed reference detector uniformly distributed at 360°. In some embodiments, a reference detector may be set outside at least two imaging optical paths, to solve problems caused by "fast energy switching" and other changes in the PCCT system. However, in the PCCT system, a nonlinear response generated by the photon counting detector under different incident energies (which is related to an X-ray tube voltage), different incident counting rates (which is related to an X-ray tube current, a scanning portion, physical signs of the target object, a real-time scanning angle, etc.), and different working conditions (e.g., whether there are pre-conditions, temperature changes in detector modules, etc.).

A detector for the imaging system is provided in some embodiments of the present disclosure, including a signal detector module and a reference detector module. In some embodiments, the reference detector module may include at least one prefilter. The prefilter may be configured to match with at least one reference detector of the reference detector module, to correct a nonlinear response of the one or more signal detectors under a preset incident condition.

Figure 2:
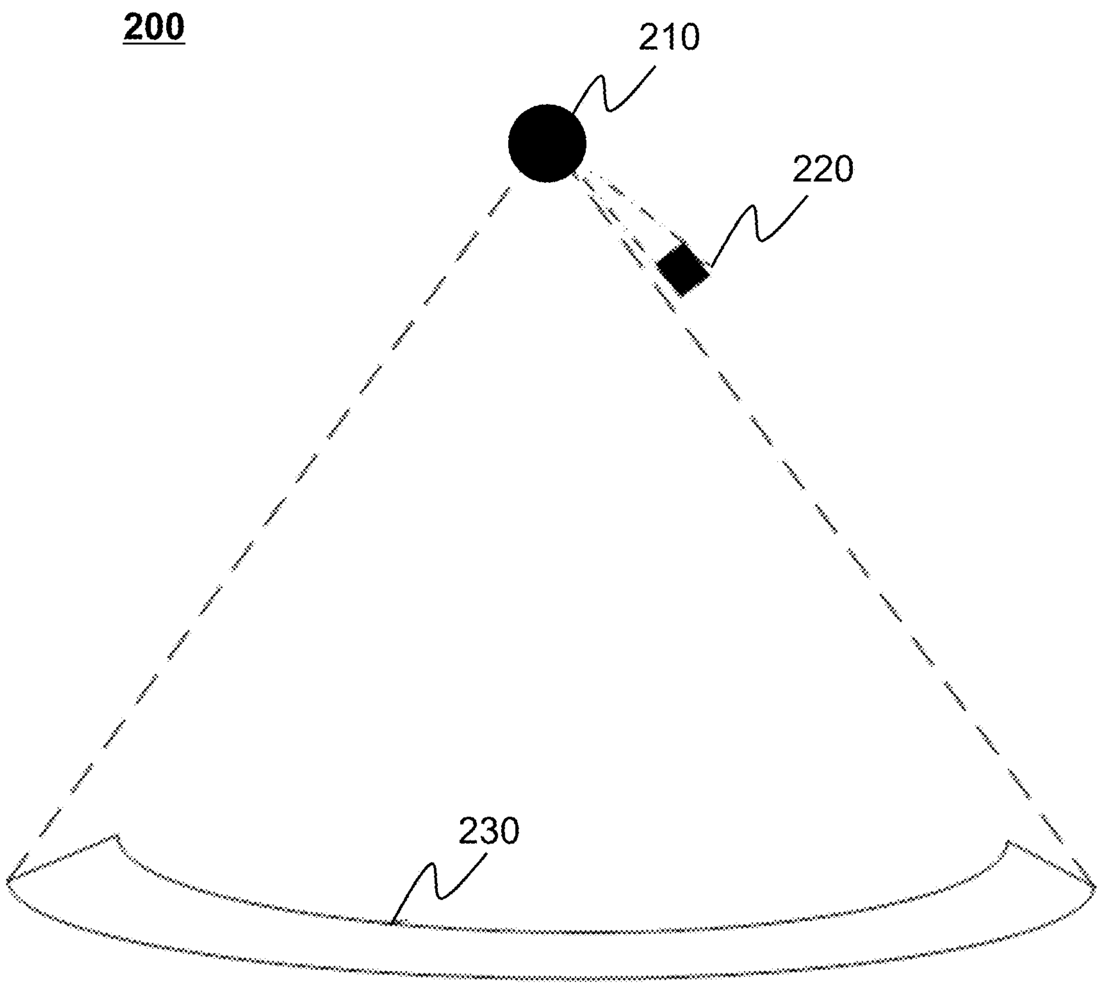
FIG. 2 is a schematic diagram illustrating an exemplary detector for an imaging system according to some embodiments of the present disclosure.

FIG. 2 is a schematic diagram illustrating an exemplary detector for an imaging system according to some embodiments of the present disclosure.

As shown in FIG. 2, in some embodiments, an imaging system 200 (e.g., an imaging device 110) may include a ray source 210, a reference detector module 220, and a signal detector module 230.

The ray source 210 may be configured to emit rays, such as X-rays. In some embodiments, the ray source 210 may include a tube.

The reference detector module 220 may be configured to measure rays that bypass the target object to correct measured data of the signal detector module 230. In some embodiments, the reference detector module 220 may include at least one reference detector. In some embodiments, the reference detector module 220 may include at least one photon counting reference detector. In some embodiments, the reference detector module 220 may include at least one energy integrating reference detector. In some embodiments, the reference detector module 220 may include at least two reference detectors. One of the reference detectors may be used to output reference data, and/or, to correct a nonlinear response of one or more signal detectors under a preset incident condition. In some embodiments, the reference detector module 220 may include a photon counting reference detector and an energy integrating reference detector.

The signal detector module 230 may be configured to measure rays that pass through the target object, to obtain a scanning image of the target object. In some embodiments, the signal detector module 230 may include at least one signal detector. In some embodiments, the signal detector(s) may include a photon counting reference detector.

In some embodiments, an energy detection range of the photon counting reference detector and an energy detection range of the photon counting signal detector may satisfy a preset condition. In some embodiments, the preset condition may include energy detection ranges of the two detectors being the same, and/or, energy thresholds (also referred to as bin thresholds) of the energy detection ranges of the two detectors being the same. For example, the signal detector module and the reference detector module may be used to receive rays within four energy detection ranges 0 keV~40 keV, 40 keV~60 keV, 60 keV~ a maximum value, respectively, wherein 40 keV and 60 keV may be an energy threshold of the energy detection range.

By making the energy detection range of the reference detector and the energy detection range of the signal detectors satisfy a preset condition, the data measured by the reference detector may be consistent or basically consistent with the data measured by the signal detectors, which can improve a correction accuracy of the signal detectors.

In some embodiments, the reference detector module 220 may be configured to correct a detector response of the signal detector module 230.

Figure 3:
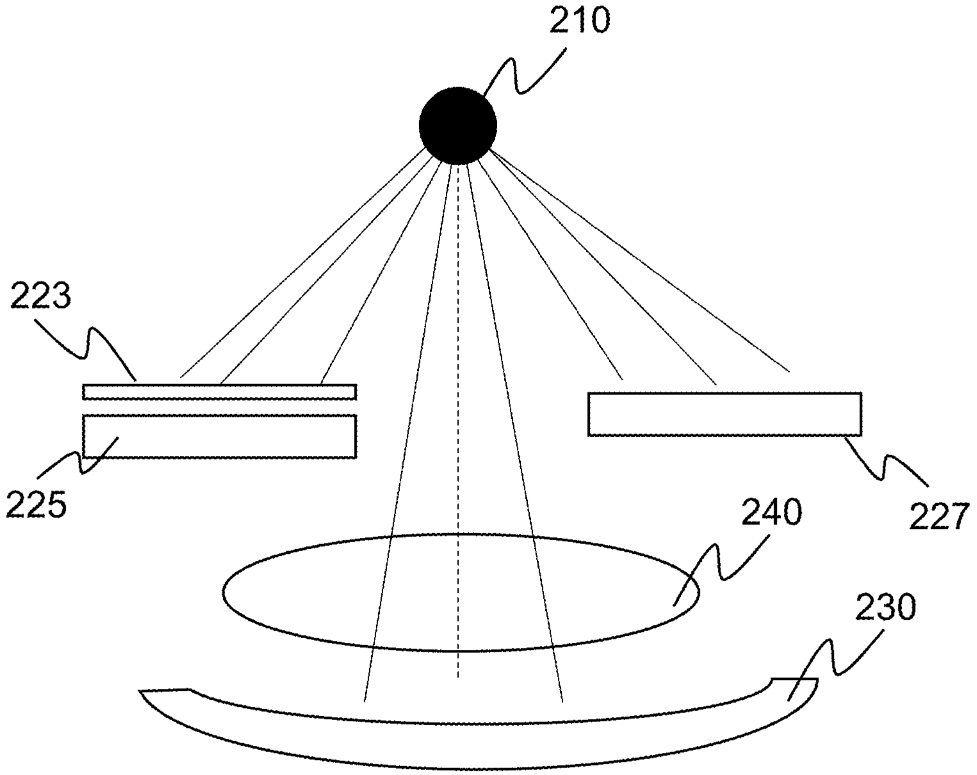
FIG. 3 is a schematic diagram illustrating another exemplary detector for an imaging system according to some embodiments of the present disclosure.

FIG. 3 is a schematic diagram illustrating another exemplary detector for an imaging system according to some embodiments of the present disclosure. As shown in FIG. 3, in some embodiments, the reference detector module 220 may include at least one prefilter 223.

Figure 4:
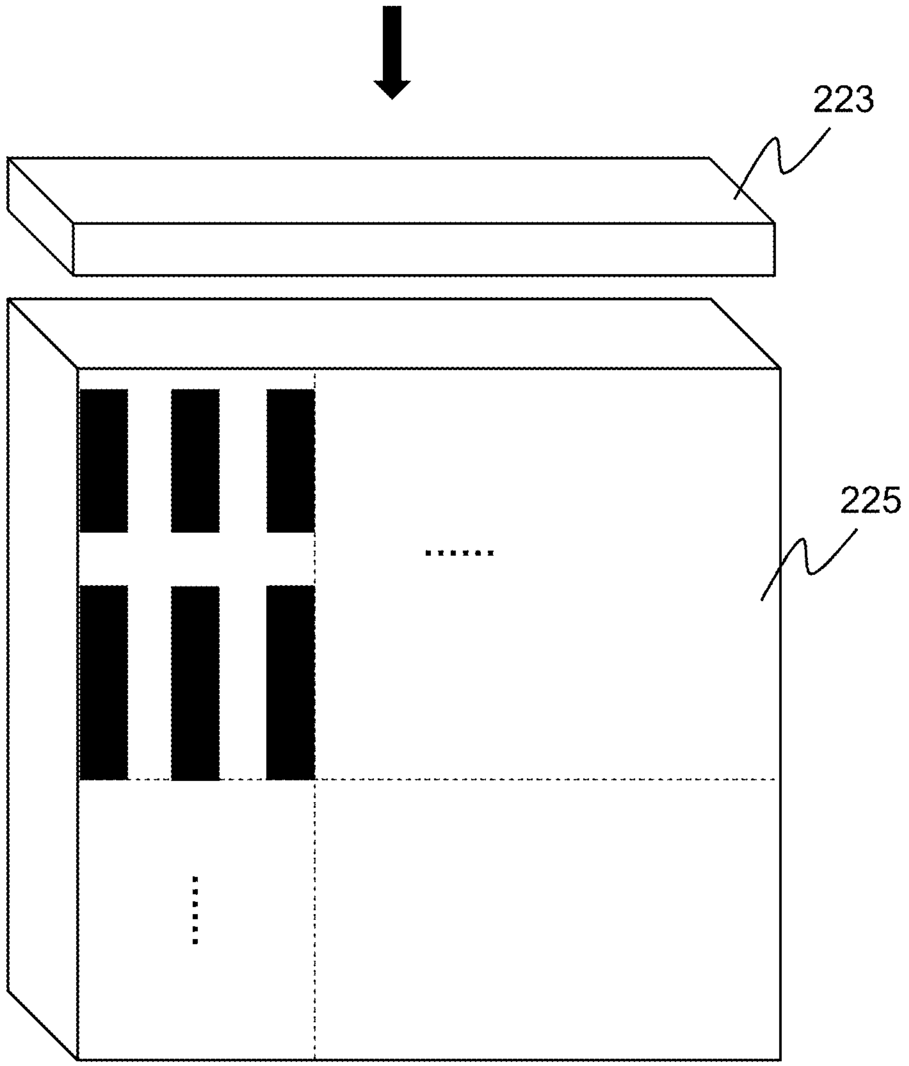
FIG. 4 is a schematic diagram illustrating an exemplary three-dimensional (3D) structure of a reference detector module according to some embodiments of the present disclosure.

In some embodiments, the at least one prefilter of the reference detector module 220 may match with the at least one reference detector to correct a nonlinear response of the one or more signal detectors (e.g., the detector(s) in the signal detector module 230) under a preset incident photon condition. In some embodiments, the prefilter may match with the photon counting reference detector. For example, as shown in FIG. 4, the reference detector module 220 may include a PCD reference detector 225 positioned below the prefilter 223, the prefilter 223 may match with the PCD reference detector 225 and filter the rays that bypass the target object and are to be received by the PCD reference detector 225, so as to correct the nonlinear response of the one or more signal detectors in the signal detector module 230 under a preset incident photon condition.

The preset incident photon condition reflects corresponding relevant parameters when the signal detectors measure the rays that pass through the target object. For example, the preset incident photon condition may include an energy detection range, an energy threshold for each range, a tube voltage, a tube current, a ray incidence angle, or the like. In some embodiments, the preset incident photon condition may be determined according to at least one of scan protocol or information of the target object. For example, a bin number, a bin threshold, a tube voltage, a tube current, or the like, may be determined based on the information of the target object. Taking the material iodine as an example, due to the k-edge absorption characteristics of the iodine and the energy of the X-rays (greater than 33 Kev), it may be difficult for the X-rays to penetrate iodine, which may easily lead photon counting values in the corresponding energy detection range to be much lower than other energy detection ranges or even 0. Therefore, for the iodine, a certain bin threshold may be set, for example, an energy detection range 1 may correspond to 30 keV~50 keV, which includes the energy of 33 KeV, and a bin threshold of an energy detection range 2 may be greater than 50 KeV.

In some embodiments, the prefilter 223 may be configured to filter the rays that are to be received by the PCD reference detector 225 and bypass the target object, to make a difference between output data (e.g., the first counting rate) of the rays that are received by the PCD reference detector 225 and output data (e.g., the second counting rate) of the rays that are received by the signal detectors and pass through the target object being less than a preset threshold. Correspondingly, under this condition, the signal detector module 230 may include a photon counting detector. The preset threshold may be any reasonable value, such as 1, 3, 5, 7, 10, or the like, which may not be limited herein. In some embodiments, the prefilter 223 may filter the rays that are to be received by the PCD reference detector 225 and bypass the target object, so that a first counting rate of rays that are received by the PCD reference detector 225 may be substantially the same as or at a substantially same level as a second counting rate of rays that are received by the signal detectors and pass through the target object.

In some embodiments, a target filtering material of the prefilter 223 may be determined according to the scan protocol. In some embodiments, by extracting a contrast agent, a substrate pair type, and/or a bin threshold from the scan protocol, the target filtering material of the prefilter 223 may be determined as iodine.

Figure 5:
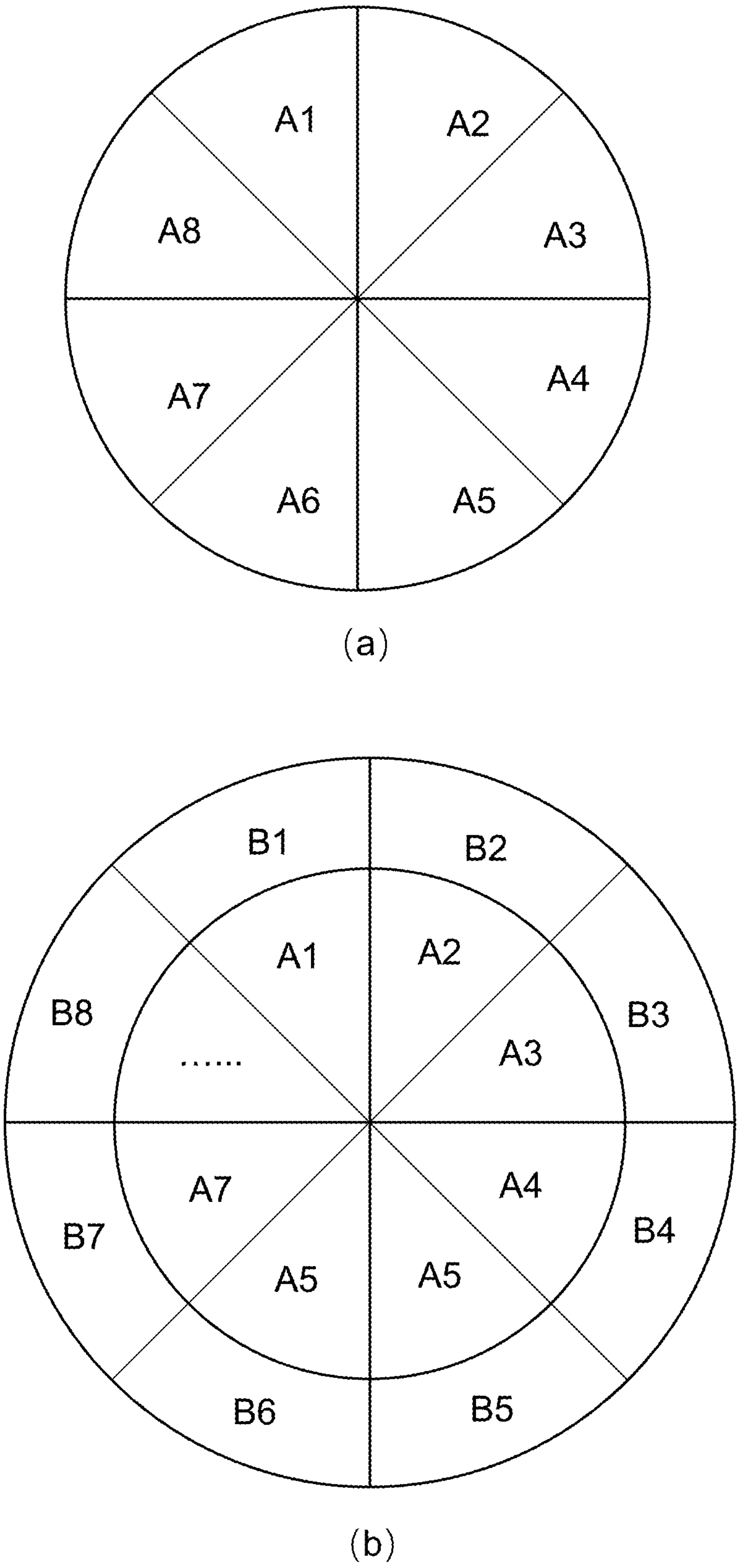
FIG. 5 is a schematic diagram illustrating an exemplary structure of a prefilter according to some embodiments of the present disclosure.

In some embodiments, the prefilter may include a plurality of filtering materials. Merely for example, as shown in FIG. 5(*a*), a prefilter 224 corresponding to the PCD reference detector 225 may include a plurality of filtering materials including A1-A8 (e.g., A1 represents iodine, A2 represents sodium, A3 represents magnesium, etc.). In some embodiments, the plurality of filtering materials may be switched for selection. For example, one of the filtering materials A1-A8 shown in FIG. 5(*a*) may be selected as a target filtering material based on attenuation characteristics of the contrast agent or target tissue under the target bin threshold.

In some embodiments, a target filtering thickness of the prefilter may be determined according to the information of the target object. The filtering thickness of the prefilter reflects a thickness of the prefilter on an optical path of the reference detector. For example, the thickness of the prefilter on the optical path of the reference detector may be changed through rotation, translation, or stacking of the prefilter. In some embodiments, the information of the target object reflects 3D information of the target object. For example, the information of the target object may include a positioning image (e.g., a CT image, an MR image, a PET image, etc.) or camera data (e.g., images of the target object captured by a camera).

Different materials under different thicknesses may have different degrees of attenuation/filtering of the rays. For example, for a same type of material, the thicker the corresponding filtering thickness, the greater the attenuation of the rays.

In some embodiments, a conversion relationship between different filtering materials under different thicknesses and attenuation coefficients of the human body to the rays (e.g., the X-rays) may be determined. For example, the conversion relationship may be determined through data statistics, simulation, and/or other manner(s). In some embodiments, the attenuation coefficient (i.e., an absorptive capacity) of the target object to the rays may be determined based on the information of the target object, and a filtering thickness of the prefilter may be determined by converting the attenuation coefficient into a thickness corresponding to the target filtering material based on the conversion relationship.

In some embodiments, the prefilter may include a plurality of filtering thicknesses, the plurality of filtering thicknesses may be switched for selection. For example, as shown in FIG. 5(*b*), the prefilter 223 may include a plurality of filtering thicknesses including B1-B8. After selecting the target filtering material, a corresponding filtering thickness may be further selected from the B1-B8 based on the information of the target object, to match with the PCD reference detector 225, so that the rays that are received by the PCD reference detector 225 and bypass the target object 240 are attenuated, and the count of the rays that are filtered and absorbed by the target object (e.g., the patient) reaching the signal detector(s) may be simulated and fed back in real time.

In some embodiments, at least one of the filtering materials or filtering thicknesses of the prefilter may be determined based on the filtering parameters of the signal detector module 230. For example, based on the filtering material and thickness of the prefilter of the signal detectors, a same filtering material and thickness may be selected for prefilter 223 in the reference detector module 220. In some embodiments, at least one of the filtering material or filtering thickness of the prefilter may be determined based on at least one of the scan protocol, the information of the target object, or the filtering parameters of the signal detector module.

By setting the prefilters of the reference detector module with different filtering materials and filtering thicknesses, (1) the output data of each bin of the PCD reference detector may be comparable to the output data of each bin of the PCD signal detectors, so that the nonlinear response of PCD is simultaneously and equivalently reflected at the PCD reference detector and the PCD signal detectors; (2) since the fact that the pre-attenuation of the PCD reference detector does not change with the rotation of the CT gantry, the performance of a PCD detector (e.g., a PCD reference detector, a PCD signal detector) in a historical short time (e.g., within 15 minutes) may generate a significant impact on the current output data. For each scan, there may be a "detector stabilization time" from the start of operation to the time the PCD detector has a stable output. Due to the same or similar performance of the PCD reference detector and PCD signal detector(s), the correction processes performed based on the response of the PCD reference detector can significantly improve the accuracy of PCD signal detector(s).

In some embodiments, the prefilter may include a butterfly prefilter. In some embodiments, the prefilter may include two rotating disks, one including different filtering materials and the other including different filtering thicknesses. By rotating one of the rotating disks, different filtering materials or thicknesses may be selected for the prefilter (e.g., the prefilter 223) to match with the reference detector (e.g., the reference detector 225). Merely for example, after determining the target filtering material based on the scan protocol and the target filtering thickness based on the positioning image, a corresponding filtering material may be selected by rotating a relatively small disk shown in FIG. 5(*b*), and a corresponding filtering thickness may be selected by rotating a relatively large disk shown in FIG. 5(*b*), so that the target filtering material and corresponding filtering thickness may be aligned with the rays to filter the rays that bypass the target object.

It should be understood that the structure, material quantity, and thickness quantity shown in FIG. 5 are only for illustration, in some embodiments, the structure corresponding to at least one of the filtering material or the filtering thickness may be of other shapes and sizes, and the prefilter may include any count of at least one of filtering materials or filtering thickness, which may not be limited herein. For example, a diameter of the disk corresponding to the filtering material and a diameter of the disk corresponding to the filtering thickness may be the same. As another example, the plurality of at least one of filtering materials or filtering thicknesses may have other structures such as a sector, a rectangle, or the like.

In some embodiments, the structure corresponding to the filtering materials may be close to the ray source, for example, the structure corresponding to the filtering material may be positioned near the position of the tube. In some embodiments, the structure corresponding to the filtering thicknesses may be close to the reference detector.

By selecting the target filtering material and target filtering thickness of the prefilter based on the scan protocol and the information of the target object and filtering the rays that bypass the target object based on the prefilter (e.g., the prefilter 223), the attenuation of the rays that are received by the reference detector (e.g., the PCD reference detector 225) corresponding to the prefilter is consistent or basically consistent with the attenuation of the rays that are received by the signal detectors and pass through the target object. So that the reference detector module may simulate and provide real-time feedback on the photon counting values of the filtered and absorbed rays reaching the reference detector, to correct the nonlinear changes in photon counting values at different energy detection ranges and/or under different milliamperes and tube currents of the detector, and improve the correction accuracy of signal detectors.

Merely for example, as shown in FIG. 3, under the preset incident photon condition, after selecting the filtering material and thickness of the prefilter 223 based on relevant information, the PCD reference detector 225 may receive the rays emitted by the ray source 210 and filtered by the prefilter 223 that bypass the target object 240, and output a corresponding photon counting value (i.e., the count of the rays); at the same time, the signal detectors in the signal detector module 230 may receive the rays that are emitted by the ray source 210 and bypass the target object 240, and output a corresponding photon counting value. Further, a detector response correction curve may be determined based on the photon counting values output by the detector(s) (e.g., the reference detector, the signal detector(s), etc.), and measured results of the signal detectors may be corrected based on the curve to correct the nonlinear response of the signal detectors under the preset incident photon condition.

As shown in FIG. 3, in some embodiments, the reference detector module 220 may include an EID reference detector 227 used to correct an unstable response caused by unstable output of the ray source in the signal detector module 230. For example, a response correction curve of the detector may be determined, under the same count of bins and bin threshold, based on an energy spectrum corresponding to measured data of the EID reference detector 227 and an energy spectrum corresponding to measured data of the signal detector module 230, the measured data of the signal detector(s) may be corrected based on the response correction curve.

In some embodiments, under different preset conditions, a corresponding response correction curve may be obtained, respectively, to correct the one or more signal detectors. For example, under a condition with specified kvp energy spectrum and unspecified photon density inputs (i.e., unspecified incident counting rates), or a condition with an unspecified kvp energy spectrum and a specified photon density input, a corresponding response correction curve of the detector (e.g., a curve with a horizontal axis representing energy (keV), and a vertical axis representing a signal strength or the incident counting rate).

Merely for example, due to an excellent linear positive correlation between the output data of the EID detector (e.g., an EID reference detector) and the input X-rays of the detector under the general CT operating condition (e.g., 10 keV~140 keV), before the first use of the CT device, the linear relationship curve between the tube currents of a group of tubes and the output data of the EID detector may be measured. When using the CT device, based on the output data of the EID reference detector, an actual X-ray output of the tube of the current CT device may be determined to correct the measured data of the signal detectors. The tube current may determine the X-ray output. Aging or other abnormal conditions of the tube may cause change(s) in the X-ray output of the X-rays emitted by the tube under the original tube current. For example, the output data of the EID reference detector 227 at the current tube current may be used as a reference to obtain an actual X-ray output of the tube, and the output data may be attenuated by scanning the object, filtered, and processed according to bin threshold(s) to obtain an expected output of each bin of the PCD signal detector. The actual output of each bin of the PCD signal detector may be fitted and corrected based on prior formula(s) to ensure that the actual output of the PCD signal detector is close to the expected output.

In some embodiments, the EID reference detector 227 may be further configured to correct the PCD reference detector 225 to obtain a correction factor for correcting the spectral response of the one or more signal detectors. For example, the correction manner of the signal detectors mentioned above may be used, the output of the EID reference detector 227 at the current tube current may be used as a reference to obtain the actual X-ray output of the tube, an expected output of the PCD reference detector 225 may be determined based on the output of the EID reference detector 227, so that the actual output of the PCD reference detector 225 may be consistent with or close to the expected output to obtain the correction factor for correcting the spectral response of the signal detectors.

In some embodiments, the correction factor for correcting the spectral response of the signal detectors may be determined based on the signal strength of the EID reference detector 227 (e.g., an energy integral value) and the signal output of the PCD reference detector 225 (e.g., the photon counting value). Merely for example, the signal strength output by the EID reference detector 227 may be designated as a total count of the photon counts, the current tube voltage and tube current of the tube may be converted to simulate a spectral intensity of the rays of the tube under different energies. The spectral intensity may be designated as the input for correcting the PCD reference detector 225, and the photon counting value output by the PCD reference detector 225 may be corrected to obtain the correction factor for correcting the spectral response of the signal detectors.

By using the output data of the EID reference detector to correct the output data of the PCD reference detector, a correction result that is not affected by the attenuation interference of the scanning object may be obtained. The correction result may be applied to the PCD signal detector to correct the output of the PCD signal detector, thereby improving the correction accuracy of the PCD signal detector.

In some embodiments, the reference detector module 220 may be configured to determine one or more data processing parameters of the signal detector. In some embodiments, by obtaining reference data output by the reference detector module 220 and analyzing the reference data, the data processing parameters of the signal detector may be determined. The output data of a reference detector (e.g., the EID reference detector, the PCD reference detector) may also be referred to as reference data. More descriptions of determining the data processing parameters may be found in FIG. 7 and related descriptions, which may not be limited herein.

In some embodiments, the rays may enter from the edge or surface of the detector. For example, the X-rays emitted by the tube may be vertically directed into at least one of the reference detector module or signal detector module in a direction indicated by the black arrow shown in FIG. 4.

It should be noted that the above description of the imaging system and/or the detector in FIG. 2-FIG. 5 is merely provided for the purposes of illustration, and not intended to limit the scope of the present disclosure. For persons having ordinary skills in the art, multiple variations and modifications for the imaging system and/or the detector may be made under the teachings of the present disclosure. For example, the imaging system 200 may include a collimator used to adjust at least one of the direction or shape of a beam of the rays. As another example, the electrode strips represented by the plurality of black rectangles in the detector shown in FIG. 4 may be replaced with coplanar gate-structured electrodes or drift-structured electrodes. As a further example, the reference detector module 220 in FIG. 3 may include a plurality of prefilters 223 and the corresponding PCD reference detectors 225, or the reference detector module 220 may include a plurality of EID reference detector 227. However, those variations and modifications do not depart from the scope of the present disclosure.

The Spectral CT refers to an imaging technique that utilizes multi spectral information to improve the image quality or provide new image information. The image quality of the Spectral CT may depend on the operator's selection of the subsequent processing parameter(s) (e.g., the data processing parameters, the image reconstruction parameters, the reconstructed image postprocessing parameters, etc.). The selection of different subsequent processing parameters provides operators with CT images that satisfy clinical requirements. In some embodiments, the data may be iteratively processed using intelligent optimization scheme(s) such as trained machine learning model(s) to output data processing parameter(s) to be used for subsequent processing. However, a large amount of photon counting data may increase the difficulty of the iterative processing.

A method for processing the detector output data is provided in some embodiments of the present disclosure, by obtaining reference data output by the reference detector module and analyzing the reference data, the data processing parameter(s) of the signal detector(s) for subsequent processing may be determined.

In some embodiments, the terminal may display default data processing parameter(s) recommend by the system on the display interface. In some embodiments, for each scan protocol, the processing device 120 may recommend a group of data processing parameters. In some embodiments, the user may adjust the recommended data processing parameter(s) according to the actual requirements, image processing effects, or the like.

Figure 6:
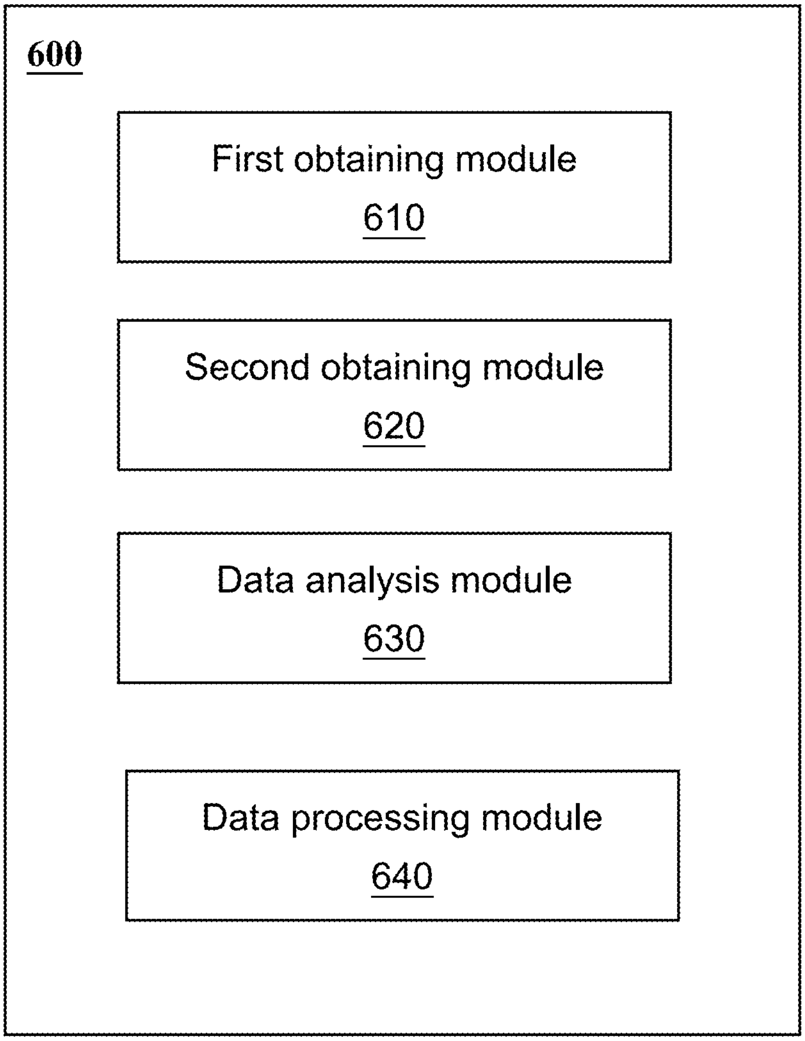
FIG. 6 is a block diagram illustrating an exemplary data processing system according to some embodiments of the present disclosure.

FIG. 6 is a block diagram illustrating an exemplary data processing system according to some embodiments of the present disclosure. As shown in FIG. 6, some embodiments of the present disclosure may provide a processing system for detector output data. In some embodiments, the data processing system 600 may include a first obtaining module 610, a second obtaining module 620, a data analysis module 630, and a data processing module 640.

The first obtaining module 610 may be configured to obtain reference data output by the reference detector module. For example, the first obtaining module 610 may be configured to obtain reference data such as at least one of photon counting values or energy integral values output by the reference detector module 220.

The second obtaining module 620 may be configured to obtain detection data output by the signal detectors. For example, the second obtaining module 620 may be configured to obtain detection data such as photon counting values output by the signal detector module 230.

The data analysis module 630 may be configured to analyze reference data to determine one or more data processing parameters. In some embodiments, the data analysis module 630 may determine the one or more data processing parameters by analyzing the reference data using a trained machine learning model. In some embodiments, the data analysis module 630 may determine the one or more data processing parameters by iteratively processing the reference data using a preset algorithm.

The data processing module 640 may be configured to process the detection data based on the one or more data processing parameters.

It should be noted that the above description of the data processing system 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
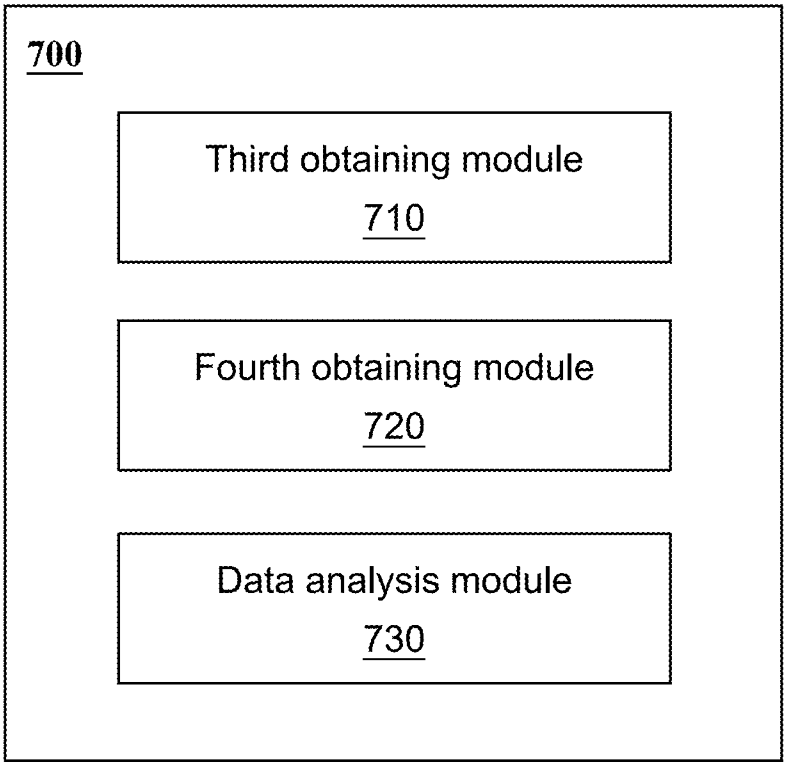
FIG. 7 is a block diagram illustrating another exemplary data processing system according to some embodiments of the present disclosure.

FIG. 7 is a block diagram illustrating another exemplary data processing system according to some embodiments of the present disclosure. As shown in FIG. 7, a data processing system is provided in some embodiments of the present disclosure. In some embodiments, the data processing system 700 may include a third obtaining module 710, a fourth obtaining module 720, and a data processing module 730.

In some embodiments, the third obtaining module 710 may be configured to obtain one or more data processing parameters. The third obtaining module 710 may obtain the one or more data processing parameters based on the reference detector module.

In some embodiments, the fourth obtaining module 720 may be configured to obtain target data. The fourth obtaining module 720 may obtain the target data collected by the signal detector(s).

In some embodiments, the data processing module 730 may be configured to process the target data based on the one or more data processing parameters.

In some embodiments, the third obtaining module 710 may be further configured to obtain reference data output by the reference detector module 220 and/or obtain the one or more data processing parameters by analyzing the reference data.

In some embodiments, the third obtaining module 710 may be further configured to filter, using at least one prefilter, rays that are to be received by the reference detector module and bypass the target object, to make a difference between a first counting rate of rays received by the reference detector module and a second counting rate of rays that are received by the one or more signal detectors and pass through the target object be less than a preset threshold; and obtaining the reference data output by the reference detector module.

It should be noted that the above description of the data processing system 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
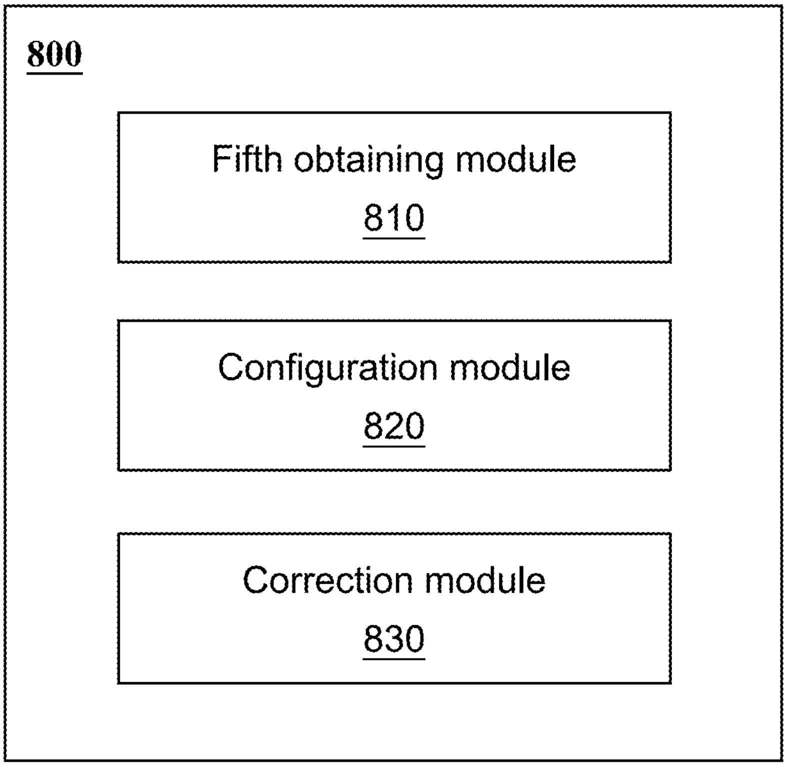
FIG. 8 is a block diagram illustrating an exemplary imaging system according to some embodiments of the present disclosure.

FIG. 8 is a block diagram illustrating an exemplary imaging system according to some embodiments of the present disclosure. As shown in FIG. 8, an imaging system is provided in some embodiments of the present disclosure. In some embodiments, the imaging system 800 may include a fifth obtaining module 810, a configuration module 820, and a correction module 830.

In some embodiments, the fifth obtaining module 810 may be configured to obtain at least one of scan protocol or information of a target object.

In some embodiments, the configuration module 820 may be configured to configure a prefilter of a reference detector module in an imaging device based on at least one of the scan protocol or the information of the target object.

In some embodiments, the correction module 830 may be configured to correct one or more target signals collected by one or more signal detectors using the reference detector module.

In some embodiments, the configuration module 820 may be further configured to determine the prefilter includes a plurality of sub-prefilters, the plurality of sub-prefilters have at least one of different filtering materials or different filtering thickness, and the prefilter is capable of switching between the plurality of sub-prefilters.

In some embodiments, the correction module 830 may be further configured to obtain reference data output by the reference detector module, the reference data may correspond to one or more signals of rays filtered by the prefilter and detected by the reference detector module; obtain the one or more target signals collected by the one or more signal detectors; and correct the one or more target signals based on the reference data.

In some embodiments, the correction module 830 may be further configured to obtain one or more data processing parameters by analyzing the reference data; and process the target data based on the one or more data processing parameters.

It should be noted that the above description of the imaging system 800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 9:
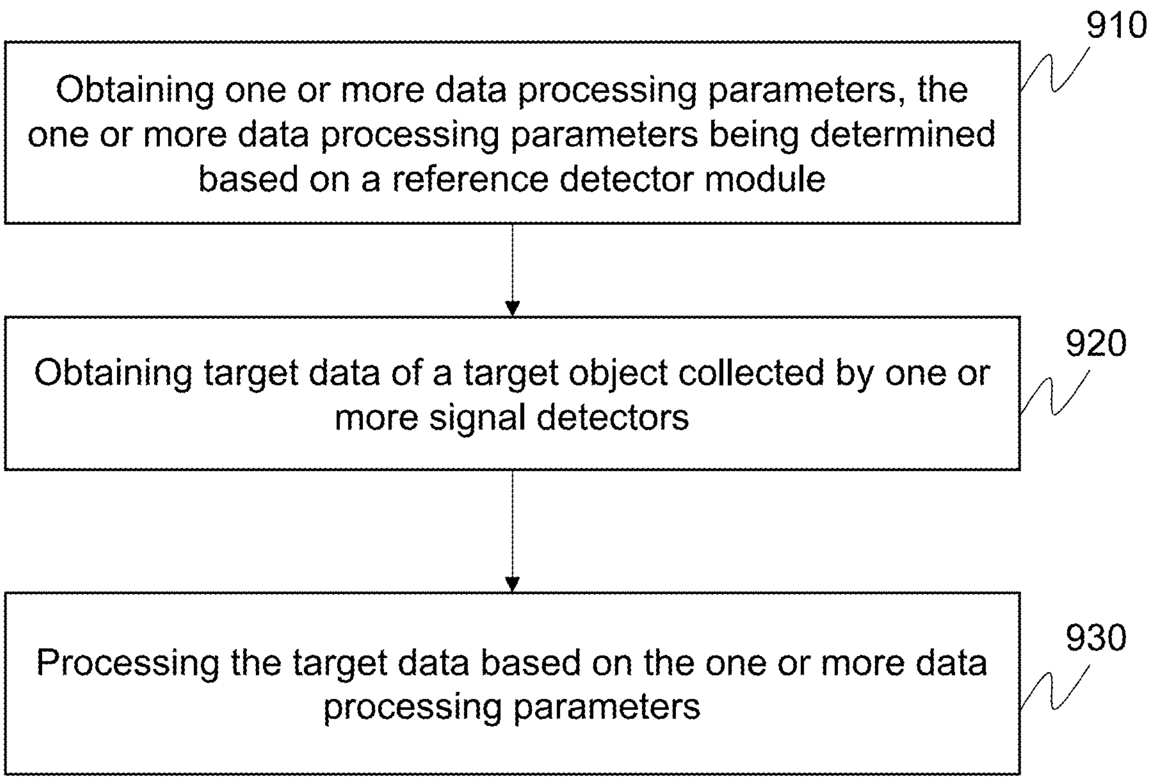
FIG. 9 is a flowchart illustrating an exemplary process for data processing according to some embodiments of the present disclosure.

FIG. 9 is a flowchart illustrating an exemplary process for data processing system according to some embodiments of the present disclosure. In some embodiments, the process 900 may be performed by the processing device 120. As shown in FIG. 9, the process 900 may include one or more of the following operations.

In 910, one or more data processing parameters may be obtained, the one or more data processing parameters may be obtained based on the reference detector module.

The one or more (recommended) data processing parameters may include detector output data processing parameter(s), imaging reconstruction parameter(s), reconstructed image post-processing parameter(s), or the like. More descriptions of the data processing parameter(s) may be found in FIG. 12 and related descriptions. The recommended scheme may provide a candidate processing parameter set for the operator.

In some embodiments, the processing device 120 may obtain one or more data processing parameters only by the reference detector module. it should be noted that the processing device 120 may not obtain the data processing parameters by the signal detector. More descriptions of the reference detector module may be found in FIG. 2 and related descriptions.

The reference detector module may be configured to correct measured data of the signal detector module by measuring rays that bypass the target object. For example, the imaging device may include one or more reference detectors, the one or more reference detectors may form a reference detector module. The count and positions of the one or more reference detectors may be set according to the actual requirements. More descriptions of the reference detector module may be found in FIG. 2 and related descriptions.

In some embodiments, the processing device 120 may obtain the reference data output by the reference detector module; and obtain the one or more data processing parameters by analyzing the reference data.

The reference data refers to preprocessed measured data obtained from the rays that bypass the target object and detected by the reference detector module. For example, the reference data may include a photon counting value, an energy integral value, or the like. The processing device 120 may obtain reference data output by the detector module.

In some embodiments, the processing device 120 may filter, using at least one prefilter, rays that are to be received by the reference detector module and bypass the target object, to make a difference between a first counting rate of rays received by the reference detector module and a second counting rate of rays that are received by the one or more signal detectors and pass through the target object be less than a preset threshold; and obtain the reference data output by the reference detector module.

The prefilter may be configured to attenuate a count of incident photons in the reference detector. The prefilter may simulate the absorption of incident photons by the target object. By combining the prefilter with the reference detector, a nonlinear response of the signal detector under a preset incident photon condition may be corrected. The nonlinear response refers to a nonlinear response of the signal detector under at least one of different counts of photons or at different irradiation times. More descriptions of the prefilter may be found in FIG. 3, FIG. 4, and related descriptions.

In some embodiments, the prefilter may include at least one of a plurality of filtering materials or a plurality of filtering thicknesses. More descriptions of the prefilter may be found in FIG. 4, FIG. 5, and related descriptions.

In some embodiments of the present disclosure, by configuring prefilters with different filtering materials and filtering thicknesses, for an imaging device with energy integral detectors, at least one energy integral detector may be used as the reference detector to correct detector stability issues caused by unstable X-ray source output. For an imaging device with photon counting detectors, at least one photon counting detector cooperating with the prefilter including different filtering materials and filtering thicknesses may be used to simulate and feedback, in real time, the counting value of the X-rays that reach the signal detector(s) after absorbed by the target object, to correct an inconsistent response of signal detector(s) (e.g., photon counting detector(s)) under the incident photon condition.

In some embodiments, at least one prefilter may filter the rays that are to be received by the reference detector module and bypass the target object, the filtering manner may be determined by setting different filtering materials.

In some embodiments, at least one prefilter may filter the rays that are to be received by the reference detector module and bypass the target object, the filtering manner may be determined by setting different filtering thicknesses. Different materials with different filtering thicknesses have various degrees of attenuation/filtering of the rays. For example, for a same type of material, the thicker the corresponding filtering thickness, the greater the attenuation of the rays.

More descriptions of the different materials and different filtering thicknesses may be found in FIG. 5 and related descriptions.

The counting value of the rays received by the reference detector module refers to a corresponding photon counting value output by the rays that are emitted by the ray source, filtered by the prefilter with a corresponding filtering material and a filtering thickness, and to be received by the PCD reference detector, under the preset incident condition.

The counting value of the rays that are received by the one or more signal detectors and pass through the target object refers to a corresponding photon counting value output by the rays that are emitted by the ray source, pass through the target object, and are received by the signal detector(s). More description of counting value of the rays to be received by the reference detector module and the counting value of the rays to be received by the signal detector and pass through the target object may be found in FIG. 3 and related descriptions.

The preset threshold may be any reasonable value, such as 1, 3, 5, 7, 10, etc., which may not be repeated herein. The preset threshold may be obtained by retrieving stored data, obtaining user input data, or the like.

In some embodiments, a difference between the first counting rate of rays to be received by the filtered reference detector module and the second count output by the signal detector may be less than the preset threshold, and the processing device 120 may obtain the reference data output by the target reference detector module.

In some embodiments of the present disclosure, by filtering the rays that bypass a target object and are to be received by the reference detector module using the at least one prefilter, to make a difference between the first counting rate of rays received by the reference detector module and the second counting rate of rays that pass through the target object and are received by the one or more signal detectors be less than a preset threshold, so that the first counting rate of rays received by the reference detector module is roughly consistent with the second counting rate of rays that are received by the one or more signal detectors (i.e., reaching a same degree or order of magnitude), the accuracy of the reference data output by the reference detector module and the accuracy of the subsequent determined data processing parameters can be improved, and the quality of reconstructed images can be further improved.

In some embodiments, the data analysis module may determine data processing parameters by analyzing the reference data using the trained machine learning model. In some embodiments, the data analysis module may determine data processing parameters by iteratively calculating the reference data through a preset algorithm. More descriptions of the data analysis module may be found in FIG. 12 and related descriptions.

In some embodiments of the present disclosure, by analyzing the reference data, the data processing parameters may be obtained, the data processing parameters may be a data processing parameter set that can achieve an optimal CNR; the data processing parameter set may be used as a convenient and effective candidate scheme for operators.

In 920, target data may be obtained. The target data may be collected by the signal detector.

The target data refers to detection data corresponding to the rays that pass through the target object and are received by the one or more signal detectors and relevant data of the target object, or the like. For example, the target data may include a photon counting value, scanning data of the target object, a medical image, or the like.

The target data may be obtained by the fourth obtaining module. For example, the fourth obtaining module may be configured to obtain detection data output by the signal detection module such as the photon counting value, etc. More descriptions of the fourth obtaining module may be found in FIG. 7 and related descriptions.

The signal detector refers to a detector that detects the rays or other signals that pass through the target object. For example, the signal detector may include a photosensitive module and a readout circuit. The photosensitive module may be configured to collect photon signals of incident rays, and convert the collected photon signals into electrical signals. The readout circuit may be configured to read out the electrical signals collected in the photosensitive module and convert the electrical signals into digital data for generating medical images.

In 930, the target data may be processed based on the one or more data processing parameters.

In some embodiments, the processing device 120 may process the target data based on the determined data processing parameters. The processing of the target data may include data correction, image reconstruction, optimizing the reconstructed image, or the like. For example, the processing device 120 may perform data correction on the target data based on the detector output data processing parameters in the data processing parameters. As another example, the processing device 120 may perform image reconstruction based on the image reconstruction parameters in the data processing parameters and the corrected target data. A general process of image reconstruction may include obtaining the corrected target data and image reconstruction parameters of several energy detection ranges based on the signal detector, and the processing device 120 may reconstruct the corrected target data of the energy detection range into an image. During the process of reconstructing the image, different images obtained by different energy detection ranges require image fusion, and the fusion of different images requires appropriate image reconstruction parameters (e.g., image denoising level values, fusion weight values of images obtained from different energy detection ranges, etc.). As another example, for the completed reconstrued image, the processing device 120 may obtain a CT image with better image quality by optimizing the completed reconstrued image based on the reconstructed image postprocessing parameters. More descriptions of reconstructed image and optimizing the completed reconstrued image may be found in FIG. 11 and related descriptions.

The processing device may simulate the absorption of the rays by the target object through the prefilter and use a non-uniform response characteristic curve of the reference detector module as the baseline to determine the one or more data processing parameters. The processing device may correct the target data of the signal detector based on the one or more processing parameters. The reference detector module may play a crucial role in correcting an actual response of the signal detector to the attenuation of the rays that pass through the target object by referring to the actual response of the detector module. If there is no reference to the data processing parameters of the detector module, the correction of the target data of the signal detector may only be performed using the calibration function for "hard" fitting, reducing the calibration effect.

In some embodiments of the present disclosure, the data processing parameters may be obtained based on the reference detector module, the target data of the signal detector may be processed, which can improve the accuracy of processing the target data, improve the quality of reconstructed images, and thus improve the accuracy of diagnostic results.

It should be noted that the above processes are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 10:
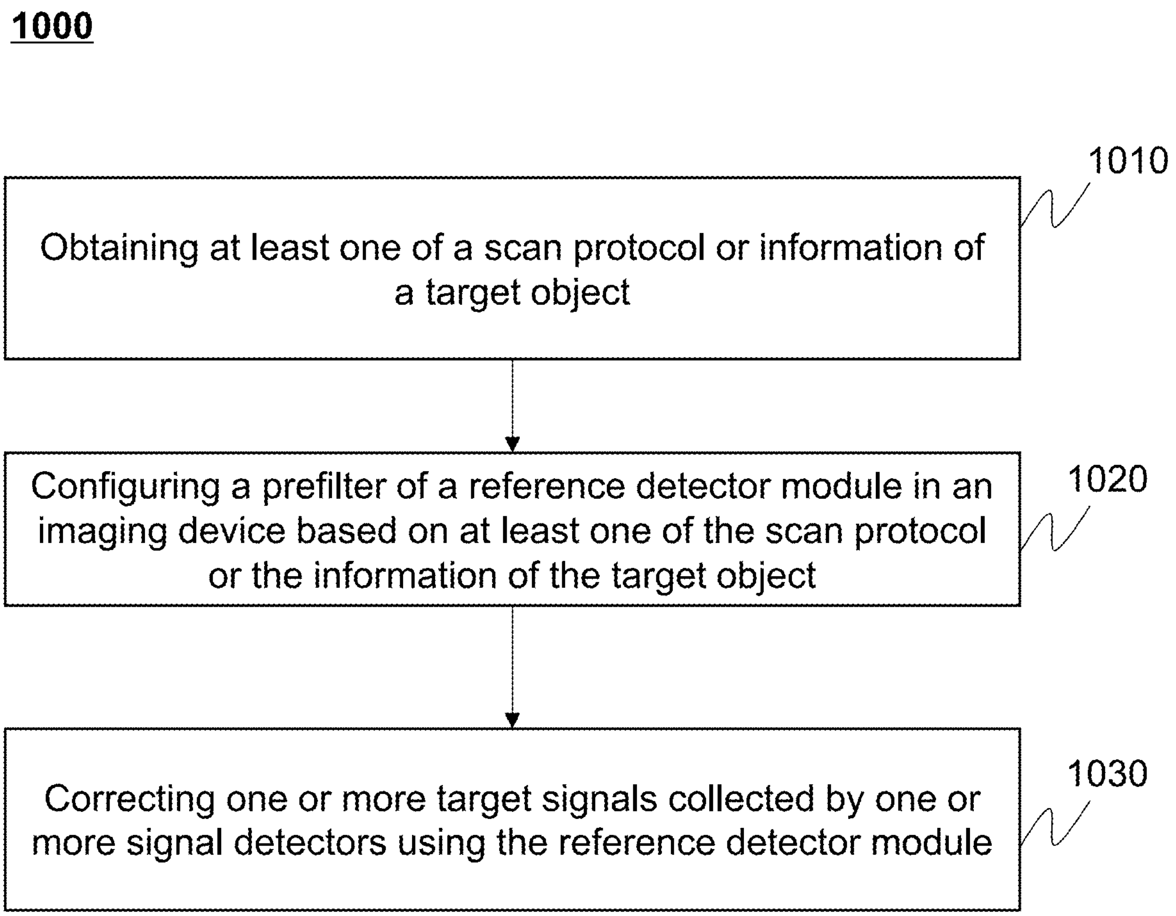
FIG. 10 is a flowchart illustrating an exemplary imaging process according to some embodiments of the present disclosure.

FIG. 10 is a flowchart illustrating an exemplary imaging process according to some embodiments of the present disclosure. In some embodiments, the process 1000 may be performed by the processing device 120. As shown in FIG. 10, the process 1000 may include one or more of the following operations.

In 1010, at least one of scan protocol or information of a target object may be obtained.

The scan protocol refers to specification for scanning parameters used in the CT imaging technology. In some embodiments, the scan protocol may include a manner for determining the filtering material and thickness of the prefilter (i.e., a mapping relationship between different scanning parameters and the filtering material and thickness of the prefilter). More descriptions of the scan protocol may be found in FIG. 3 and related descriptions.

More description of the information of the target object may be found in FIG. 5 and related descriptions.

In some embodiments, the scan protocol may be obtained through manual settings. In some embodiments, the information of the target object may be obtained by preliminary scan by CT and camera photography.

In 1020, a prefilter of a reference detector module in an imaging device may be configured based on at least one of the scan protocol or the information of the target object.

The prefilter of the reference detector may use different materials and thicknesses, because the photon of the signal detector passes through the human body or phantom, a significant portion of the X-ray photons may be attenuated. Because the incident photon of the reference detector dose not pass through the human body or phantom, and the incident counting rate of the reference detector may be much higher than the incident counting rate of the signal detector. Prefilter(s) need to be used to make the incident counting rate of the reference detector and the signal detector comparable (i.e., reaching the same degree or order of magnitude).

In some embodiments, the prefilter of the reference detector module in the imaging device may be selected based on at least one of the scan protocol or the information of the target object.

The processing device 120 may select the prefilter by multiple manners. In some embodiments, the processing device 120 may select a prefilter that needs to be configured by the database (e.g., a vector database) based on at least one of the scan protocol or the information of the target object. The vector database refers to a database used for storing, indexing, and querying vectors. Through the vector database, similarity queries and other vector management may be performed on a large number of vectors. In some embodiments, the vectors of in the vector database may include a prefilter vector corresponding to the scanning object, the information corresponding to the scanning object may include at least one of the scan protocol or the information of the target object, and the prefilter vector may include configuration information of the prefilter. In some embodiments, the prefilter vector corresponding to the scanning object may be determined based on historical filter configuration experience data. In some embodiments, the prefilter vector in the vector database may be determined based on the historical filter configuration experience data.

In some embodiments, a target feature vector feature may be determined by extracting features from the target object (i.e., the scanning object). Based on the target feature vector, a vector that satisfy the preset condition may be determined through the vector database, and the vector that satisfy the preset condition may be determined as an associated feature vector. The preset condition refers to a condition for filtering the associated feature vector. In some embodiments, the preset condition may include a similarity of a target feature vector greater than a threshold.

In some embodiments, the configuration information of the prefilter in the filter vector corresponding to the associated feature vector may be used as a prefilter corresponding to at least one of the scan protocol or the information of the target object.

In some embodiments, the processing device 120 may determine at least one of a target filtering material or a target filtering thickness of the prefilter based on at least one of the scan protocol or the information of the target object; and configure the prefilter based on at least one of the target filtering material or the target filtering thickness.

The processing device 120 may determine at least one of the target filtering material or target filtering thickness by multiple manners. The target filtering material and/or a target filtering thickness refers to at least one of the filtering material or filtering thickness used in the target scan. More descriptions of determining the filtering material based on the scan protocol may be found in FIG. 2 and related descriptions. More descriptions of determining the filtering thickness based on the information of the target object may be found in FIG. 5 and related descriptions.

The prefilter may be configured by multiple manners. In some embodiments, the filter may be configured directly using at least one of the determined filtrating material or filtrating thickness.

In some embodiments, the prefilter includes a plurality of sub-prefilters, the plurality of sub-prefilters have at least one of different filtering materials or different filtering thickness, and the prefilter is capable of switching between the plurality of sub-prefilters.

The switching manner between at least one of a plurality of filtering materials or a plurality of filtering thicknesses may be mechanical.

In some embodiments, the switching may be achieved using one or more rotating disks with a center as the circular axis. For example, the count of rotating disks may be one, and different portions of the rotating disk may have different filtering thicknesses or different filtering materials. As another example, the count of rotating disks may be two, and the rotating disks may be divided into an upper disk and a lower disk. The different portions of the upper disk may contain different types of filtering materials, while the different portions of the lower disk may contain filtering materials with different filtering thicknesses corresponding to different portions of the upper disk. The count of rotating disks, as well as the design and distribution of at least one of various filtering materials or multiple filtering thicknesses, may be designed according to actual requirements. The processing device 120 may issue control instructions to the controller of the rotating disk, which can control the rotation of the rotating disk to switch to at least one of the desired thickness or material. More descriptions of switching between at least one of the plurality of filtering materials or the plurality of filtering thicknesses may be found in FIG. 5 and related descriptions.

In some embodiments of the present disclosure, the particularity of photon detectors makes them exhibit non-completely consistent responses under different operating conditions (e.g., a kV value (i.e., a tube voltage of the tube), an incidence counting rate, etc.), the prefilter may switch between at least one of the plurality of filtering materials or the plurality of filtering thicknesses, which can correct adverse effects on output counts caused by changes in working conditions, and further improve the efficiency and quality of CT scanning.

In some embodiments of the present disclosure, based on at least one of the scan protocol or the information of the target object, at least one of a target filtering material or a target filtering thickness of the prefilter may be de determined, so that an incident counting rate of the reference detector may be consistent with an incident counting rate of the detector that measures the actual signal, to correct any adverse effects on the output counting caused by changes in operating conditions.

In 1030, the target signal collected by the signal detector may be corrected by using the reference detector module.

The target signal refers to a signal of the rays that pass through the target object and are to be received by the detector.

The processing device 120 may correct the target signal by multiple manners. In some embodiments, the target signal may be corrected based on a correction curve. More descriptions of correcting the target signal based on the correction curve may be found in FIG. 3 and related descriptions.

In some embodiments, the processing device 120 may obtain the one or more data processing parameters based on the reference detector module, to correct the target signal of the signal detector. More descriptions of correcting the target signal based on the one or more data processing parameters may be found in FIG. 11 and related descriptions.

Figure 12:
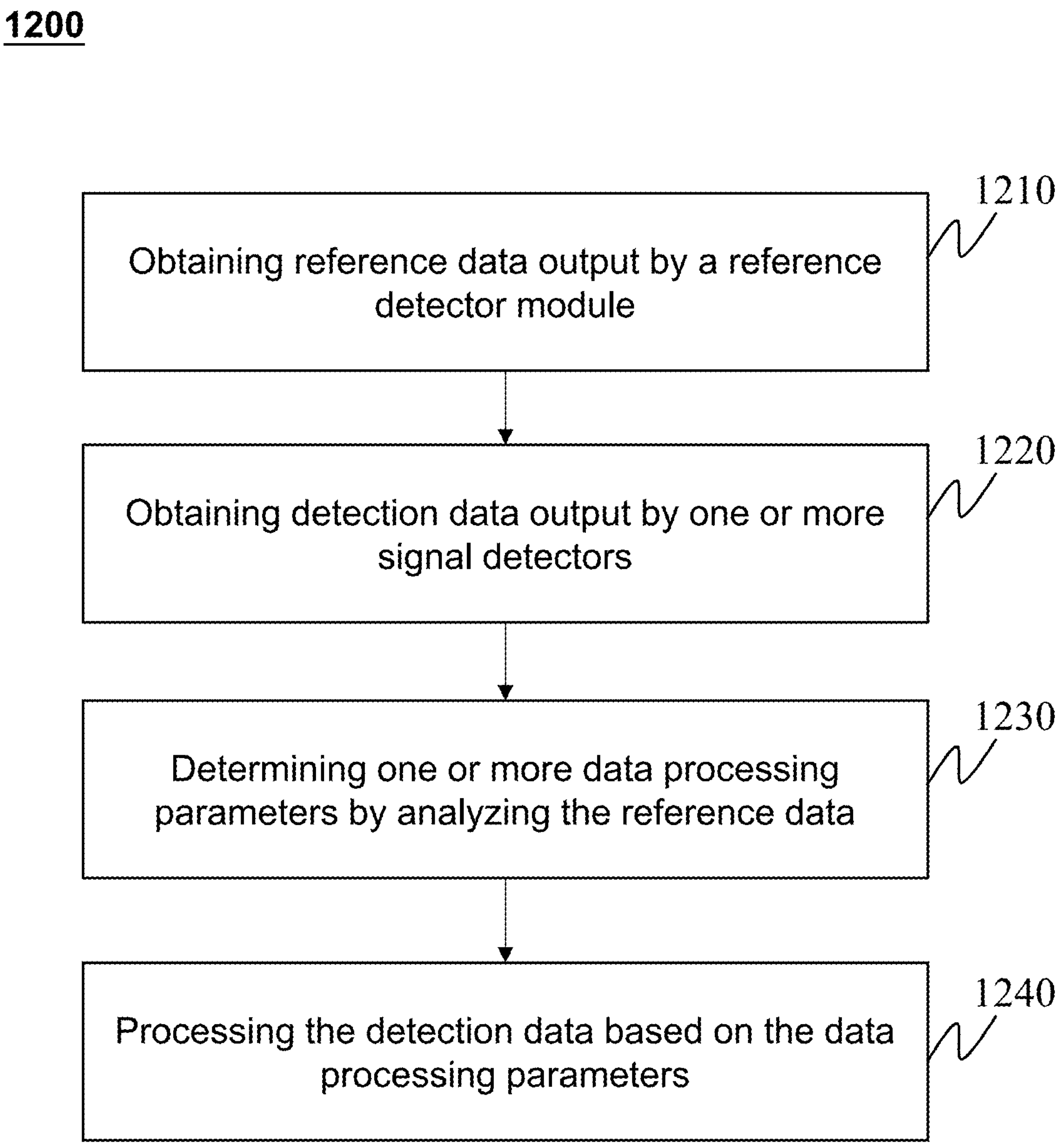
FIG. 12 is a flowchart illustrating an exemplary process for data processing according to some embodiments of the present disclosure.

More descriptions of the beneficial effect of some embodiments of the present disclosure may be found in FIG. 12 and related descriptions.

It should be noted that the above processes are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 11:
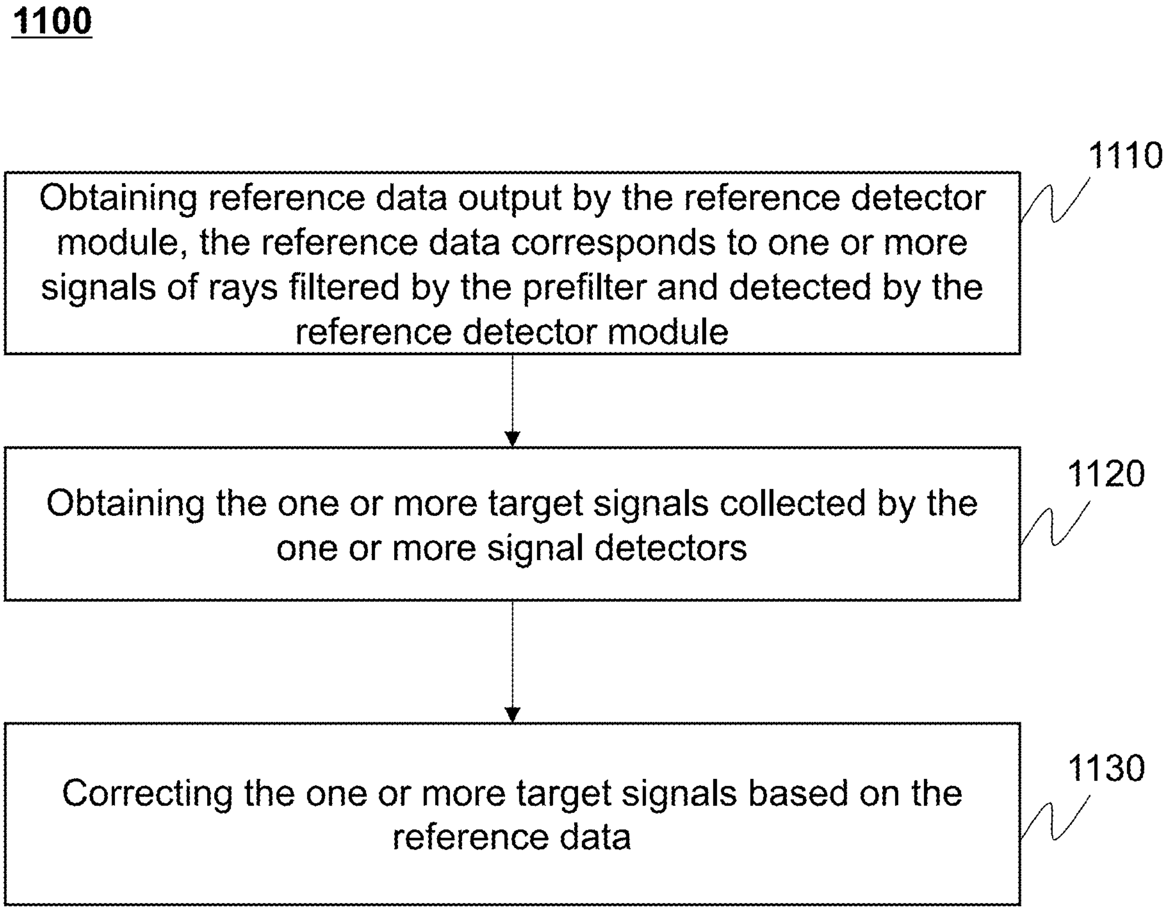
FIG. 11 is a flowchart illustrating an exemplary process for correcting target signal(s) according to some embodiments of the present disclosure.

FIG. 11 is a flowchart illustrating an exemplary process for correcting target signal(s) according to some embodiments of the present disclosure. In some embodiments, the process 1100 may be performed by the processing device 120. As shown in FIG. 11, the process 1100 may include one or more of the following operations:

In 1110, reference data output by the reference detector module may be obtained, the reference data may correspond to one or more signals of rays filtered by the prefilter and detected by the reference detector module.

The reference data refers to measured data obtained from a preliminary processing of the rays that bypass the target object and are to be received and detected by the reference detector module.

More descriptions of the reference data may be found in FIG. 9 and related descriptions.

In 1120, the one or more target signals collected by the one or more signal detectors may be obtained.

More descriptions of the target signal and collecting the target signal may be found in FIG. 10 and related descriptions.

In 1130, the one or more target signals based on the reference data may be corrected.

The processing device 120 may correct the target signal based on the reference data by multiple manners. In some embodiments, the corrected target signal may be determined by analyzing the reference data and the target signal using the trained machine learning model. The input of the machine learning model may include the reference data and the target signal, the output of the machine learning model may be the corrected target signal.

The target signal may correspond to the target data. In some embodiments, the processing device 120 may obtain one or more data processing parameters by analyzing the reference data; the target data may be processed based on the one or more data processing parameters.

More descriptions of obtaining the data processing parameters may be found in FIG. 12 and related descriptions.

More descriptions of the target data may be found in FIG. 9 and related descriptions. More descriptions of processing the target data based on the one or more data processing parameters may be found in FIG. 12 and related descriptions.

In some embodiments, the processing may include at least one of reconstruction or postprocessing.

The reconstruction refers to the image reconstruction. The postprocessing refers to a further processing for the completed reconstructed image (e.g., optimization).

The reconstruction process refers to a process of reconstructing collected data from the plurality of energy detection ranges into images. By filtering, interpolation, projection, and other processing on the data, the image noise, artifacts, and blurriness can be reduced, and the spatial resolution and contrast of the image can be improved. The postprocessing refers to a further processing of the reconstructed image, such as removing artifacts, enhancing contrast, segmenting regions of interest, 3D visualization, to further optimize the image quality and improve diagnostic accuracy. When reconstructing and postprocessing the target data, based on a signal-to-noise ratio of multiple images with different energy detection ranges, a final image may be output through linear or other forms of superposition of multiple images with different energy detection ranges. The image processing device 120 with multiple energy detection ranges may obtain the images with different energy detection ranges based on the corrected target signal(s) and image reconstruction parameters with multiple energy detection ranges. More descriptions of reconstruction and postprocessing may be found in FIG. 9 and related descriptions.

The reference detector module may be a detector module with a relatively small imaging area, and output data of the reference detector module may reflect a noise level of the image under the target scanning parameters. Based on the rapid analysis of the data results of the reference detector module, the one or more data processing parameters may be obtained. The processor may obtain the one or more data processing parameters such as a noise reduction level and a signal-to-noise ratio that are not affected by the attenuation degree of the target object. The operator(s) may rely on the data processing parameters to confirm the noise reduction level, filter function and other reconstructed parameters, so as to improve the quality of the reconstructed image.

Compared with the signal detector, the data processing parameters obtained by the reference detector may not include the attenuation information of the target object, and may clearly obtain a pure data noise level and signal-to-noise ratio of the data in each energy detection range under target collected parameters (e.g., a tube current, a tube voltage, a count of energy detection ranges, a range of each energy detection range, etc.). during the postprocessing, the data processing parameters may play an important reference role in weighting processing. If there are no data processing parameters obtained from the reference detector module, the weighting processing may be entirely set by the operator(s) based on experience, or the operators may read the relevant noise and image quality parameters of the images of the target object for setting, which may reduce the accuracy of postprocessing.

A high-quality energy spectrum resolution CT image may depend not only on the setting of the scanning parameter set, but also on the parameter selection of reconstruction, correction, postprocessing, and other processes. In some embodiments of the present disclosure, the reference detector module filtered with different filtering materials may be constructed to recommend parameters for subsequent processing of data after the completion of the setting out for the selection of operators, to obtain images with optimal clinical outcomes, which can further optimize the image quality of target data and reflect the tissue structure and pathological changes of the target object better.

In some embodiments of the present disclosure, by analyzing the reference data, the data processing parameters suitable for processing target data may be obtained, the data processing parameters may be customized according to different application scenarios and needs, which can improve the accuracy and efficiency of data processing.

In some embodiments of the present disclosure, by processing the target signal collected by the signal detector with the reference data output by the reference detector module, the quality and reliability of the target signal can be improved.

It should be noted that the above processes are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 12 is a flowchart illustrating an exemplary process for detector output data processing according to some embodiments of the present disclosure. In some embodiments, the data processing process 1200 may be performed by the imaging device 110 or the processing device 120. For example, the data processing process 1200 may be stored in a storage device (e.g., the storage device 140) in the form of programs or instructions. When the imaging device 110 or the processing device 120 executes the programs or instructions, the data processing process 1200 may be implemented. In some embodiments, the data processing process 1200 may be performed by the data processing system 600.

In 1210, reference data output by a reference detector module may be obtained. In some embodiments, the operation 1210 may be performing the first obtaining module 610.

The reference data refers to measured data of the rays that bypass the target object and are to be received by the reference detector. In some embodiments, the measured data of rays that bypass the target object and are to be received by the reference detector module 220 may be obtained.

In 1220, detection data output by one or more signal detectors may be obtained. In some embodiments, the operation 1220 may be performed by the second obtaining module 620.

The detection data refers to measured data of the rays that are received by the one or more signal detectors and pass through the target object. In some embodiments, the measured data of rays that are received by the signal detectors module 230 and pass through the target object may be obtained.

In 1230, one or more data processing parameters may be determined by analyzing the reference data. In some embodiments, the operation 1230 may be performed by the data analysis module 630.

In some embodiments, the data processing parameters may include one or more of a processing parameter of detector output data, an image reconstruction parameter, a reconstructed image postprocessing parameter, or the like. In some embodiments, the data processing parameters may include at least one of the following: a weight value corresponding to each energy detection range of the signal detectors, types of the noise reduction algorithm used in the image reconstruction, noise reduction levels, reconstructed image layer thicknesses, filter functions, reconstruction fields of view, sizes of reconstruction matrixes, a weight value of each substrate image, image values (e.g., CT values, gray values, etc.), extraction/removal manners, or the like.

In some embodiments, by analyzing the reference data, a data processing parameter set may be output that can achieve an optimal contrast to noise ratio (CNR) for predetermined image indicators. In some embodiments, the data processing parameters may be determined by analyzing the reference data using a trained machine learning model. In some embodiments, the data processing parameters may be determined by iteratively processing the reference data using the preset algorithm. Merely for example, the reference data may be input into a trained machine learning model to obtain the weight value corresponding to each energy detection range output by the machine learning model.

In some embodiments, the machine learning model for determining the data processing parameters of the signal detectors may be trained based on the data collection setting parameters of the detector and the data processing parameters used for subsequent processing. Merely for example, based on the reference data output by the reference detector and the detection data output by the signal detectors, the conventional image reconstruction and image post-processing may be performed to obtain reference images and signal images with the same characteristics (e.g., an optimal CNR or low contrast enhancement). A data processing parameter 1 may be extracted for the reference data in the image reconstruction and image postprocessing, and a data processing parameter 2 for the detection data in the image reconstruction and image postprocessing, respectively, a setting parameter 1 and setting parameter 2 may be obtained for the reference detector and signal detector during the data collection from the parameter configuration module. Further, an initial model with data processing parameters 1 and 2, the setting parameter 1 of the reference detector, and the setting parameter 2 of the signal detector may be trained as sample data, respectively, to determine the data processing parameters of the signal detectors by obtaining a trained machine learning model.

In 1240, the detection data may be processed based on the data processing parameters. In some embodiments, the operation 1240 may be performed by the data processing module 640.

In some embodiments, the detector data may be processed based on the determined data processing parameters to obtain energy spectrum CT images with better image quality. For example, the detector data may be calculated based on the weight value corresponding to each energy detection range of the determined signal detector, and/or the spectrum CT images may be obtained by performing the iterative reconstruction on the determined reduced algorithm.

The detection data may be processed based on the weight value corresponding to each energy detection range, which makes a distinction between contrast and non-contrast regions in the obtained image more obvious, thereby improving the accuracy of diagnostic results. The contrast region refers to a region in the target object where the contrast agent is added, correspondingly, the non-contrast region reflects a region without the contrast agent. Taking the application of iodine contrast agent for scanning as an example, due to the significant absorption of radiation with energy greater than 33 keV by the iodine, the measured data obtained in the energy detection range of 30 keV to 45 keV may be much smaller than the measured data in other energy detection ranges. In this condition, if the weight value of the energy detection range is greater than the weight values of other energy detection ranges, which reflects the CT value or grayscale value of the images, the value corresponding to the energy detection range may be significantly different from the values of other energy detection ranges, which can help doctors have a clearer understanding of the location of the contrast region and the difference between the contrast region and other regions, thereby improving diagnostic efficiency and accuracy of results It should be noted that the above description of the process 1200 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

An imaging device may be provided in the present disclosure, the device may include a processor and a storage device, the storage may be configured to store instructions, and the detector output data processing processes described above may be implemented when the processor executes the instructions.

A computer-readable storage medium that stores computer instructions may be provided in the present disclosure. When the computer reads the computer instructions in the storage medium, the computer executes the detector output data processing processes as described above.

The beneficial effects in the embodiments of the present discourse may include but are not limited to: (1) by adding a prefilter in the reference detector module, the reference detector may simulate the nonlinear changes in photon counting values at different energy detection ranges under different tube currents better; (2) by using an additional prefilter in front of the reference detector to filter the rays that are to be received by the reference detector, the correction can be achieved under flexible clinical scanning protocols, expanding the clinical application range of photon counting technology; (3) by equalizing the energy detection range, photon counting values, and attenuation of the received rays between the reference detector and the signal detector, a real-time and equivalent correction can be achieved, which can better correct the problem of photon counting detector power density significantly causing the detector to reach a new transient state after long-term or multiple scans, and improve the quality of imaging images; (4) based on the reference detector module that includes the energy integrating reference detector and photon counting reference detector, the nonlinearity, inconsistency, and instability of detector response caused by unstable output of the radiation source and changes in detector operating conditions can be corrected simultaneously; (5) based on the measured data of the reference detector, the optimal data processing parameters of the signal detector may be determined, which can reduce iterative computation, improve data postprocessing efficiency, and improve the image quality of the energy spectrum CT images; (6) by utilizing the machine learning model or iterative algorithm to analyze the reference data, the processing efficiency can be improved and the impact of computational complexity can be reduced.

It should be noted that different embodiments may produce different beneficial effects. In different embodiments, the possible beneficial effects may be any one or a combination of the above, or any other possible beneficial effects. The basic concepts have been described. Obviously, for those skilled in the art, the detailed disclosure may be only an example and may not constitute a limitation to the present disclosure. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the specification are not necessarily all referring to the same embodiment. In addition, some features, structures, or features in the present disclosure of one or more embodiments may be appropriately combined.

Moreover, unless otherwise specified in the claims, the sequence of the processing elements and sequences of the present application, the use of digital letters, or other names are not used to define the order of the application flow and methods. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various assemblies described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure and aiding in the understanding of one or more of the various embodiments. However, this disclosure may not mean that the present disclosure object requires more features than the features mentioned in the claims. In fact, the features of the embodiments are less than all of the features of the individual embodiments disclosed above.

In some embodiments, the numbers expressing quantities, properties, and so forth, used to describe and claim certain embodiments of the application are to be understood as being modified in some instances by the term "about," "approximate," or "substantially." Unless otherwise stated, "about," "approximate," or "substantially" may indicate a ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Although the numerical domains and parameters used in the present application are used to confirm the range of ranges, the settings of this type are as accurate in the feasible range in the feasible range in the specific embodiments.

Each patent, patent application, patent application publication, and other materials cited herein, such as articles, books, instructions, publications, documents, etc., are hereby incorporated by reference in the entirety. In addition to the application history documents that are inconsistent or conflicting with the contents of the present disclosure, the documents that may limit the widest range of the claim of the present disclosure (currently or later attached to this application) are excluded from the present disclosure. It should be noted that if the description, definition, and/or terms used in the appended application of the present disclosure is inconsistent or conflicting with the content described in the present disclosure, the use of the description, definition and/or terms of the present disclosure shall prevail.

At last, it should be understood that the embodiments described in the disclosure are used only to illustrate the principles of the embodiments of this application. Other modifications may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method implemented on at least one machine each of which has at least one processor and at least one storage device for data processing, comprising:

obtaining one or more data processing parameters, the one or more data processing parameters being determined based on a reference detector module, wherein the reference detector module includes a prefilter, the prefilter is configured to match with at least one reference detector of the reference detector module, the prefilter includes a plurality of sub-prefilters, the plurality of sub-prefilters have at least one of different filtering materials or different filtering thicknesses, and the prefilter is capable of switching between the plurality of sub-prefilters;

obtaining target data of a target object collected by one or more signal detectors; and processing the target data based on the one or more data processing parameters.

2. The method of claim 1, wherein the one or more data processing parameters are obtained by:

obtaining reference data output by the reference detector module; and obtaining the one or more data processing parameters by analyzing the reference data.

3. The method of claim 2, wherein the reference data output by the reference detector module is obtained by:

filtering, using the prefilter, rays that bypass the target object and are to be received by the reference detector module, to make a difference between a first counting rate of rays received by the reference detector module and a second counting rate of rays that pass through the target object and are received by the one or more signal detectors be less than a preset threshold; and obtaining the reference data output by the reference detector module.

4. The method of claim 1, wherein the reference detector module includes at least one photon counting reference detector and at least one energy integrating reference detector, and the at least one energy integrating reference detector is configured to:

obtain a correction factor for correcting a spectral response of the one or more signal detectors by correcting the at least one photon counting reference detector.

5. A method implemented on at least one machine each of which has at least one processor and at least one storage device for imaging, comprising:

obtaining at least one of a scan protocol or information of a target object;

configuring a prefilter of a reference detector module in an imaging device based on at least one of the scan protocol or the information of the target object, wherein the prefilter includes a plurality of sub-prefilters, the plurality of sub-prefilters have at least one of different filtering materials or different filtering thicknesses, and the prefilter is capable of switching between the plurality of sub-prefilters; and correcting one or more target signals collected by one or more signal detectors using the reference detector module.

6. The method of claim 5, wherein the configuring a prefilter of a reference detector module in an imaging device based on at least one of the scan protocol or the information of the target object includes:

determining at least one of a target filtering material or a target filtering thickness of the prefilter based on at least one of the scan protocol or the information of the target object; and configuring the prefilter based on at least one of the target filtering material or the target filtering thickness.

7. The method of claim 5, wherein the correcting one or more target signals collected by one or more signal detectors using the reference detector module includes:

obtaining reference data output by the reference detector module, the reference data corresponds to one or more signals of rays filtered by the prefilter and detected by the reference detector module;

obtaining the one or more target signals collected by the one or more signal detectors; and correcting the one or more target signals based on the reference data.

8. The method of claim 7, further comprising:

obtaining one or more data processing parameters by analyzing the reference data; and processing target data of the target object based on the one or more data processing parameters.

9. The method of claim 5, wherein the prefilter is configured to:

filter rays that bypass the target object and are to be received by the reference detector module, to make a difference between a first counting rate of rays received by the reference detector module and a second counting rate of rays that pass through the target object and are received by the one or more signal detectors be less than a preset threshold.

10. The method of claim 5, wherein the prefilter includes one rotating disk, the rotating disk includes different portions having different filter materials or different filtering thicknesses, the prefilter is capable of switching between the plurality of sub-prefilters such that a target sub-prefilter, among the plurality of sub-prefilters, with a target filtering material and/or a target filtering thickness is aligned with and filter the rays that bypass the target object, and the switching between the plurality of sub-prefilters is achieved by rotating the rotating disk.

11. The method of claim 10, wherein the prefilter includes a first rotating disk and a second rotating disk, the first rotating disk includes portions having different filtering materials, and the target filtering material is selected by rotating the first rotating disk, and the second rotating disks includes portions having different filtering thicknesses, and the target filtering thickness is selected by rotating the second rotating disk.

12. The method of claim 5, wherein the plurality of sub-prefilters are distributed in a sector-shaped or rectangular array, and/or the plurality of sub-prefilters are configured to cover an entire cross-section of a reference beam, so that different portions of the reference beam are filtered by different sub-prefilters.

13. An imaging system, comprising:

a processing device configured to obtain reference data output by a reference detector module, analyze the reference data, and determine one or more data processing parameters for one or more signal detectors;

wherein the reference detector module includes at least one prefilter, the at least one prefilter is configured to match with at least one reference detector of the reference detector module;

the reference detector module includes at least one photon counting reference detector and at least one energy integrating reference detector, and the at least one energy integrating reference detector is configured to obtain a correction factor for correcting a spectral response of the one or more signal detectors by correcting the at least one photon counting reference detector.

14. The system of claim 13, wherein the one or more signal detectors includes a photon counting detector; and the at least one prefilter including a plurality of filtering materials is configured to filter rays that bypass a target object and are to be received by the reference detector module, to make a difference between a first counting rate of rays received by the reference detector module and a second counting rate of rays that pass through the target object and are received by the one or more signal detectors be less than a preset threshold.

15. The system of claim 14, wherein a target filtering material of the prefilter is determined based on a scan protocol, and/or, a target filtering thickness of the prefilter is determined based on information of the target object.

16. The system of claim 13, wherein an energy detection range of the at least one photon counting reference detector and an energy detection range of the one or more signal detectors satisfy a preset condition.

17. The system of claim 16, wherein the preset condition includes the energy detection range of the at least one photon counting reference detector and the energy detection range of the one or more signal detectors being the same, and/or, an energy threshold of the energy detection range of the at least one photon counting reference detector and an energy threshold of the energy detection range of the one or more signal detectors being the same.

18. The system of claim 13, wherein the at least one energy integrating reference detector is further configured to:

correct an unstable response of the one or more signal detectors caused by an unstable output of a ray source.

19. The system of claim 13, wherein the one or more data processing parameters are determined by analyzing the reference data using a trained machine learning model, wherein the one or more data processing parameters include a noise reduction level and a signal-to-noise ratio that are not affected by an attenuation degree of a target object.

20. The system of claim 13, wherein the one or more data processing parameters include at least one of: a weight value corresponding to each energy detection range of the one or more signal detectors, a type of a noise reduction algorithm used in image reconstruction, a noise reduction level, a reconstructed image layer thickness, a filter function, a reconstruction field of view, a size of a reconstruction matrix, a weight value of each substrate image, image value, or an extraction and removal manner.

* * * * *